(12) United States Patent
Strassner et al.

(10) Patent No.: US 9,663,386 B2
(45) Date of Patent: May 30, 2017

(54) EXTRACTION OF NOBLE METAL (IONS) BY MEANS OF IONIC LIQUIDS

(75) Inventors: Thomas Strassner, Dresden (DE); Tobias Schulz, Köln (DE); Gert Bernhard, Dresden (DE); Johannes Raff, Dresden (DE); Falk Lehmann, Dresden (DE)

(73) Assignees: TECHNISCHE UNIVERSITAT DRESDEN, Dresden (DE); HELMHOLTZ-ZENTRUM DRESDEN-ROSSENDORF E.V., Dresden (DE)

( * ) Notice: Subject to any disclaimer, the term of this patent is extended or adjusted under 35 U.S.C. 154(b) by 665 days.

(21) Appl. No.: 14/236,087

(22) PCT Filed: Jul. 31, 2012

(86) PCT No.: PCT/EP2012/064940
§ 371 (c)(1),
(2), (4) Date: May 13, 2014

(87) PCT Pub. No.: WO2013/017588
PCT Pub. Date: Feb. 7, 2013

(65) Prior Publication Data
US 2014/0246370 A1    Sep. 4, 2014

(30) Foreign Application Priority Data

Aug. 1, 2011  (DE) ........................ 10 2011 080 230

(51) Int. Cl.
| | | |
|---|---|---|
| C02F 1/26 | (2006.01) | |
| B01D 11/02 | (2006.01) | |
| C01F 17/00 | (2006.01) | |
| C22B 60/02 | (2006.01) | |
| C01G 55/00 | (2006.01) | |
| C02F 101/20 | (2006.01) | |

(52) U.S. Cl.
CPC ............ *C02F 1/26* (2013.01); *B01D 11/0292* (2013.01); *C01F 17/0006* (2013.01); *C01G 55/001* (2013.01); *C22B 60/026* (2013.01); *C02F 2101/20* (2013.01)

(58) Field of Classification Search
CPC . B01D 11/02; B01D 11/0288; B01D 11/0292; C01G 5/00; C01G 5/0003; C01G 7/00; C01G 7/003; C01G 55/00; C01G 55/001; C01G 55/002; C01G 56/00; C01G 56/001; C01G 99/00; C01G 99/003; C02F 1/26; C02F 2101/20; C01F 7/00; C01F 7/006; C01F 17/0006; C22B 3/16; C22B 3/20; C22B 60/00; C22B 60/02; C22B 60/026
USPC ....... 210/634, 638, 639; 423/8, 21.5, 22, 24, 423/27
See application file for complete search history.

(56) References Cited

U.S. PATENT DOCUMENTS

| | | | |
|---|---|---|---|
| 6,379,634 B1* | 4/2002 | Fields .................... | C01G 43/00 423/10 |
| 2004/0262578 A1* | 12/2004 | Wasserscheid ....... | C07D 231/12 252/364 |
| 2005/0090704 A1 | 4/2005 | Roettger et al. | |
| 2006/0128996 A1* | 6/2006 | Vaultier ............... | B01J 31/0239 568/312 |
| 2007/0026460 A1 | 2/2007 | von Hagen et al. | |
| 2007/0191612 A1* | 8/2007 | Ohno ................... | C07D 233/56 548/335.1 |
| 2011/0020509 A1* | 1/2011 | Kalb ....................... | B03C 1/015 426/237 |
| 2011/0105761 A1 | 5/2011 | Strassner et al. | |
| 2012/0186446 A1* | 7/2012 | Bara .................... | B01D 53/228 95/44 |

FOREIGN PATENT DOCUMENTS

| | | |
|---|---|---|
| DE | 102005027172 A1 | 12/2006 |
| WO | 03070667 A1 | 8/2003 |
| WO | 2009095012 A1 | 8/2009 |

OTHER PUBLICATIONS

Publication: Andrew Abbott et. al, "Processing of metals and metal oxides using ionic liquids", Green Chemistry, 2011, vol. 13, pp. 471-481.*
Publication: P. Wassercheid et. al, "Ionic Liquids in Synthesis", Copyright 2002, Wiley-VCH Vergla GmbH & Co. KGaA.*
The International Search Report dated Oct. 19, 2012 for PCT Application No. PCT/EP2012/064940.
The Written Opinion of the International Searching Authority dated Oct. 19, 2012 for PCT Application No. PCT/EP2012/064940.
De los Rios et al. "Removal of metal ions from aqueous solutions by extraction with ionic liquids." Journal of Chem. & Eng. Data 2010, 55, 605-608.
Fischer et al. "Ionic liquids for extraction of metals and metal containing compounds form communal and industrial waste water." Water Research 45 (2011) 4601-4614.
Lertlapwasin et al. "Ionic liquid extraction of heavy metal ions by 2-aminothiophenol in 1-butyl-3-methylimidazolium hexafluorophosphate and their associate constants." Separation and Purification Technology 72 (2010) 70-76.
Rajendran et al. "Effective extraction of heavy metals from their effluents using some potential ionic liquids as green chemicals." E-Journal of Chemistry 2011, 8(2), 697-702.
Visser et al. "Task-specific ionic liquids incorporating novel cations for the coordination and extraction of Hg2+ and Cd2+: synthesis, characterization, and extraction studies." Environ. Sci. Technol. 2002, 36, 2523-2529.

* cited by examiner

*Primary Examiner* — Joseph Drodge
(74) *Attorney, Agent, or Firm* — Amster, Rothstein & Ebenstein LLP

(57) ABSTRACT

The present invention relates to a process for the extraction of metals from an aqueous phase by means of specific ionic liquids.

10 Claims, No Drawings

EXTRACTION OF NOBLE METAL (IONS) BY MEANS OF IONIC LIQUIDS

CROSS-REFERENCE TO RELATED APPLICATIONS

This application is a U.S. national phase of PCT Application No. PCT/EP2012/064940, filed Jul. 31, 2012, which claims priority to German Application No. 10 2011 080 230.4, filed Aug. 1, 2011.

The present invention relates to a process for the extraction of metals, in particular heavy metals, from aqueous phases by means of ionic liquids.

Much of the waste water from hospitals, salvage plants, metal processing companies, power stations, stain and paint manufacturers as well as other companies being active in this field contain heavy metals and toxic or radioactive metals, respectively, and are strongly acidic. Likewise, said metals can be found in a number of cooling water circuits of the aforementioned companies. Prior to injection into the ground water, such waste water needs to be purified in order to avoid contamination of the environment.

It is known in the prior art that ionic liquids may be employed for the purification and extraction, respectively, of aqueous solutions. Due to the advantageous properties of the ionic liquids such as, for example, low vapour pressures, low flammability and combustibility, they represent an ideal "green" solvent for a number of chemical processes. The field of ionic liquids is intensively investigated at present as the possible applications are diverse. Ionic liquids are used to extract, for example, substances and compounds from solutions or solid phases. This is disclosed in, for rumple, DE 10 2005 027 172 A1 which teaches a process for the extraction of proteins, protein fragments and/or peptides from biological samples. Another example represents WO 03/070667 A1 relating to a process for the liquid/liquid extraction or liquid/gas extraction of mixtures of organic compounds wherein one or more components of the mixture are extracted at least partially by means of a phase containing an ionic liquid. Another field of application of ionic liquids is the extraction of metals from solutions, in particular from aqueous solutions. Advantages of the extraction with ionic liquids as compared to other processes reside, for example, in the use of simple and inexpensive equipment, a high throughput and relatively safe handleability. Therefore, one aim is to replace common liquid/liquid extraction processes which use water immiscible organic solvents often being toxic, carcinogenic, combustible and highly volatile by extraction with ionic liquids. Processes for the extraction of metals by means of ionic liquids are described, for example, in "Solvent extraction of strontium nitrate by a crown ether using room-temperature ionic liquids", S. Dai, Y. Ju und C. Barnes, J. Chem. Soc., Dalton Trans., 1999, 1201-1202. Apart from ionic liquids, crown ethers are used as additional extracting agents.

However, the extraction processes known in the art have different disadvantages. One disadvantage of the prior art resides in the use of an additional extracting agent which is employed besides ionic liquids. Said agent may reside in the aqueous phase to a certain extent. Additionally, many extracting agents and/or the metal complexes are toxic or carcinogenic and, thus, are harmful. In these cases, the extraction of the metal or metal ion is achieved basically by means of the extracting agent and the ionic liquid merely provides an additional positive effect on the extraction. In 2007, K. Binnemans postulated in "Lanthanides and Actinides in Ionic Liquids", Chem. Rev., 2007, 107, 2592-2614 that, in general, it is not possible to extract metal ions from aqueous phases without employing additional extracting agents such as, for example, β-diketones or CMPO (octyl(phenyl)-N,N-diisobutylcarbamoylmethylphosphinoxide), besides ionic liquids.

In particular cases, these problem can be circumvented by the synthesis of "task specific ionic liquids" (TSILs). For this purpose, tailor-made ionic liquids are synthesized for each application. Typically, these TSILs consist of an ionic liquid comprising complexing groups in the molecular structure. In "Task-Specific Ionic Liquids Bearing 2-Hydroxybenzylamine Units: Synthesis and Americium-Extraction Studies", Chem. Eur. J. 2006, 12, 3074-3081, A. Ouadi, B. Gadenne, P. Hesemann et al. describe the synthesis of TSILs and the extraction of americium ions from aqueous phases. Indeed, no external extracting agents need to be added in these particular cases but, however, expensive and complex syntheses are required in order to covalently bind the functional groups of the extracting agent to the molecules forming the ionic liquid.

Another problem resides in the pH sensitivity of the known procedures. Indeed, some known processes show good extraction in a basic but not in an acidic environment. Accordingly, in V. Egorov, D. Djigailo, D. Momotenko et al.: "Task-specific ionic liquid trioctylammonium salicylate as extraction solvent for transition metal ions", Talanta, 2010, 80, 1177-1182, the partition coefficients D fall below 1 in an acidic environment.

Another problem resides in the unselective extraction of known processes. Indeed, some known processes show good selectivity towards particular metal ions which, however, must be traced back to different stability constants or reactivities of the added extracting agents towards the metal ions. Depending on their ring size, crown ethers are, thus, suitable for the selective extraction of specific ions.

Therefore, one object of the present invention is the provision of a process for the extraction of metals, in particular heavy metals from aqueous phases which reduces or overcomes the above-mentioned disadvantages. In particular, one object is the provision of a process which can be performed without the addition of further extracting agents and, preferably, can be applied over wide pH ranges. Additionally, the process should provide high extraction ratios and high distribution coefficients and allow for the selective extraction of particular metal ions.

The above-mentioned problem is solved by the inventive process for the extraction of metals from aqueous phases by means of extraction by an ionic liquid. In the inventive process, ionic liquids of general formula (I)

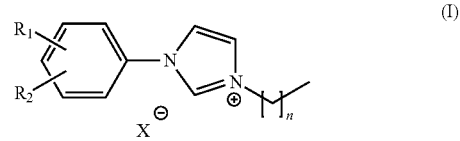

are used, wherein
i) $X^-$ is an anion,
ii) n is a number from 0 to 14,
iii) $R^1$ and $R^2$ independently from each other are —H, -halogen, —$NO_2$, —$NH_2$, —$NHR_x$, —$N(R_x)_2$, —$R_x$, —C(O)OH, —C(O)$OR_x$, —C(O)$R_x$ and —$OR_x$,
wherein $R_x$ is a straight-chained or branched, optionally substituted C1 to C18 alkyl group, and no additional extracting agents are used and the pH value of the aqueous phase is between 8 and 0.

According to the inventive process, an ionic liquid according to general formula (I) is provided and is added to the aqueous phase to be purified which contains the metals to be extracted. Both liquids are mixed, for example by agitation, whereby the metal is extracted from the aqueous phase by means of the ionic liquid. One advantage of the inventive process is that by using the specific ionic liquids of formula (I) according to the present invention, no additional extracting agents need to be used. Additionally, the inventive process is pH stabilized. This means that the process is less sensitive as compared to conventional processes. The extraction ratio only varies slightly over the whole pH range to be applied reflecting a nearby stable extracting performance.

"Ionic liquids" in the meaning of the present invention are liquids and liquid salts, respectively, which exclusively consist of ions which do not require to be dissolved in a solvent in order to be liquid. These liquid salts normally consist of a cation and an anion and do not contain neutral molecules. Normally, ionic liquids have melting points of below 100° C. Where the melting point of ionic liquids is below 30° C., they are liquid at room temperature and are also called "room temperature ionic liquids" (RTILs) and often consist of organic salts comprising nitrogen containing heterocycles, such as imidazolium or pyridinium derivatives.

"Extracting agents" in the meaning of the present invention are any organic or inorganic solvents or compounds being capable of extracting metal ions from aqueous phases. The extraction may occur by dissolving said metal ions in the solvent or by ionic or covalent binding. Furthermore, an extraction with an extracting agent is also possible by complexing or chelation while forming a metal-extracting agent complex. According to the present invention, no additional extracting agents are added for the extraction except for the inventive ionic liquids of formula (I).

"Alkyl groups" in the meaning of the present invention are saturated hydrocarbon chains which may be either straight-chained or branched and contain a given number of carbon atoms. Branched means that one or both hydrogen atoms at a $CH_2$ group of the linear alkyl chain are substituted by one or two alkyl groups. In the meaning of the present invention, the number of carbon atoms is defined by the term "C1-C18" meaning that the alkyl chain consists of from 1 to 18 carbon atoms. The number of carbon atoms thereby refers to both the carbon atoms of the scaffold as well as to the branch but not to the carbon atoms of the substituent.

"Substituted" in the meaning of the present invention means that one or more hydrogen atoms of the alkyl group is substituted by one or more substituents selected from the group comprising -halogen, $-NO_2$, $-NH_2$, $-NHR_x$, $-N(R_x)_2$, $-R_x$, $-C(O)OH$, $-C(O)OR_x$, $-C(O)R_x$ and $-OR_x$.

The term "metal" in the meaning of the present invention refers to both elemental metal and dissolved metal ions which may be singly or multiply positively charged. In the meaning of the present invention, the term "metals" comprises all elements selected from the group of alkaline metals, alkaline earth metals, transition metals, rare earths, lanthanides, actinides and metals including semimetals.

In a preferred embodiment, the metal is selected from the group of alkaline metals, alkaline earth metals, transition metals, rare earths, lanthanides, actinides and metals including semimetals and preferably from the group of transition metals, lanthanides, actinides and metals including semimetals.

In another preferred embodiment, the metal is a heavy metal, preferably platinum, iridium, gold, palladium and most preferably platinum.

In another embodiment, the metal is radioactive. Suitable radioactive metals according to the inventive process are any trivalent actinides and most preferably thorium and americium.

In another embodiment, the metal comprises the group of trivalent rare earths and preferably the group of trivalent lanthanides and most preferably europium and gadolinium.

In a preferred embodiment, the pH range of the inventive process comprises the acidic, neutral and slightly basic range and is between 8 and 0 or the acidic range and is between 2 and 0.

In another preferred embodiment of the inventive process, high extraction ratios E% are achieved. The extraction ratio is a measure for the efficiency of the process and specifies the amount of metal ions (in g) taken up by the ionic liquid in relation to the total mass of metal ions at time t. The higher this value is, the better the ionic liquid extracts metal ions. In a preferred embodiment, E% is higher than 10, 25, 50, 70, 90 or 95, preferably higher than 70, 90 or 95 and most preferably higher than 95. The aforementioned extraction ratio E% of at least 10, 25, 50, 70, 90 or 95 is preferably reached within 2 hours more preferably within 1 hour and most preferably within less than 30, 25, 20 or 15 minutes.

In a preferred embodiment of the inventive process, the extraction ratio does not decrease by more than 60%, 50%, 40%, 35% or 30%, preferably by not more than 40%, 35% or 30% and most preferably by not more than 30% over the whole pH range.

In another embodiment of the inventive process, the extraction ratio does not decrease by more than 60% in the pH range between 8 and 0, by not more than 50% in the pH range between 5 and 0 and by not more than 30% in the pH range between 3 and 0.

In another preferred embodiment of the inventive process, high partition ratios D are achieved. The partition ratio is a measure for the efficiency of the process and specifies the amount of metal ions (in g) in the ionic liquid in relation to the mass of metal ions in the aqueous phase at time t. The higher this value is, the better the ionic liquid extracts metal ions. In a preferred embodiment, D is higher than 0.1, 0.3, 0.8, 1, 3, 10, 100 or 1000, more preferably higher than 100 or 1000 and most preferably higher than 1000.

The aforementioned partition ratio D of higher than 0.1, 0.3, 0.8, 1, 3, 10, 100 or 1000 is preferably reached within 2 hours, more preferably within 1 hour and most preferably within less than 30, 25, 20 or 15 minutes.

In another preferred embodiment, the inventive process can be carried out at temperatures of from 5° C. to 95° C., preferably from 15° C. to 60° C., more preferably from 20° C. to 40° C. and most preferably at approximately 25° C. The preferred temperatures provide easy handling as the liquids neither need to be cooled nor heated and, thus, one can operate at room temperature.

It was surprisingly found that ionic liquids of general formula (I) are particularly suitable for the inventive process if $X^-$ is bis(trifluoromethylsulfonyl)imide and/or dicyanamide and/or n=5 to 13, preferably is 10 and/or $R_1$ is selected from the group comprising $-H$, -halogen, $-NO_2$, $-NH_2$, $-NHR_x$, $-N(R_x)_2$, $-R_x$, $-C(O)OH$, $-C(O)OR_x$, $-C(O)R_x$ and $-OR_x$, wherein $R_x$ is a straight-chained or branched, optionally substituted C1 to C18 alkyl group and preferably occupies the para position.

The symmetry of the substitution patterns at the aromatic moiety has a specific influence on the properties of ionic liquids. In the meaning of the present invention the term "para position" refers to the C4 position at the benzene ring and indicates that it is a 1.4 substitution.

It is of particular advantage if $R^1$ and/or $R^2$ are groups having a +M-effect. Furthermore, it became apparent that it is advantageous for the inventive process if $R^2$ is -halogen, preferably Br, or $-OR_x$, wherein $R_x$ is a straight-chained or branched, optionally substituted C1 to C18 alkyl group and preferably methyl or ethyl.

The mesomeric effect (or conjugation effect) reflects the electrons in a π-bond system of a molecule and results from atoms or groups donating or withdrawing π-bond atoms into the system. The positive mesomeric effect (+M-effect) increases the electron density in the aromatic ring system by providing another own free electron pair (e.g., -halogen, —NH$_2$, —NHR$^3$, —NR$^3{}_2$, —OR$^3$). The negative mesmeric effect (–M-effect) decreases the electron density in the aromatic ring system by an electron gap withdrawing electrons from the system (e.g. —NO$_2$, —C(O)OH, —C(O)OR$^3$, —C(O)R$^3$). R$^3$ refers to a straight-chained or branched alkyl group. In the meaning of the present invention —H is defined as "neutral group".

Another advantage is that by means of the inventive process, metals selected from the group of heavy metals and preferably platinum can be extracted since many heavy metals are harmful or toxic to the human organism as they cannot be degraded. They get into the environment through waste water and accumulate in the food chain, whereby they are finally taken up by humans.

In the meaning of the present invention "heavy metals" are any metals having a density of 5 g/cm$^3$ or higher.

Another advantage is that by means of the inventive process, metals selected from the group of rare earths and/or actinides and preferably europium can be extracted. All actinides and their isotopes are radioactive and toxic and result from neutron capture in processes in nuclear power plants. Contaminations of actinides in an aqueous solutions (cooling water) and on solid surfaces (binding in the pipe system) and by accidental release, respectively, now can be purified with the specific ionic liquids of formula (I) according to the present invention. Notwithstanding the increasing industrial importance, the metals of the rare earths are difficult to extract which is why the recycling of these metals from waste waters and cooling waters of rare earths processing companies represents an important technology which may be carried out by means of the inventive process.

Another advantage is that the inventive process is pH stabilized. Therefore, the pH value does not need to be adjusted to a certain value by the prior addition of acids or basis in order to achieve optimal extraction results. The metals in the aqueous phase can be extracted immediately and without additional steps. In the inventive process the pH range is between 8 and 0, between 3 and 0 and preferably between 2 and 0.

Another advantage of the inventive process is that the extraction ratio E% only varies slightly over the whole pH range to be applied reflecting a nearby stable extracting performance. The extraction ratio does not decrease by more than 60%, 50%, 40%, 35% or 30%, preferably by not more than 30% over a pH range from 8 to 0.

The "extraction ratio E%" in the meaning of the present invention is defined as $$E\% = \frac{m(IL)}{m_0} \qquad (1)$$

wherein m(IL) is the mass of metal ions in the ionic liquid at the time t and $m_0$ is the total mass of metal ions in the system. $m_0$ corresponds to the amount of added metal ions. In a preferred embodiment, E% is higher than 10, 25, 50, 70, 90 or 95, preferably higher than 70, 90 or 95 and most preferably higher than 95. The aforementioned extraction ratio E% of at least 10, 25, 50, 70, 90 or 95 is preferably reached within 2 hours, more preferably within 1 hour and most preferably within less than 30, 25, 20 or 15 minutes.

The "partition ratio D" in the meaning of the present invention is defined as $$D = \frac{m(IL)}{m(aq)} \qquad (2)$$

wherein m(IL) is the mass of metal ions in the ionic liquid at the time t and m(aq) represents the mass of metal ions in the aqueous phase at time t, m(aq) is determined by ICP-MS, m(IL) is calculated from the difference between $m_0$ and m(aq). The time t is defined as the time at which m(aq) and m(IL) are determined and is calculated from the beginning of the extraction (time at which the ionic liquid is added to the aqueous solution). In a preferred embodiment, D is higher than 0.1, 0.3, 0.8, 1, 3, 10, 100 or 1000, more preferably higher than 100 or 1000 and most preferably higher than 1000. The aforementioned partition ratio D of higher than 0.1, 0.3, 0.8, 1, 3, 10, 100 or 1000 is preferably reached within 2 hours, more preferably within 1 hour and most preferably within less than 30, 25, 20 or 15 minutes.

One advantage of the inventive process is that by use of an ionic liquid of general formula (I),

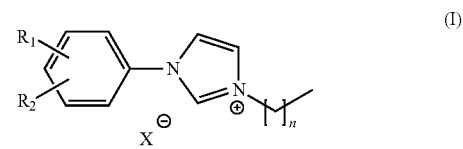

wherein
i) X$^-$ is an anion,
ii) n is a number from 0 to 14,
iii) R$^1$ and R$^2$ independently from each other are —H, -halogen, —NO$_2$, —NH$_2$, —NHR$_x$, —N(R$_x$)$_2$, —R$_x$, —C(O)OH, —C(O)OR$_x$, —C(O)R$_x$ and —OR$_x$,
wherein R$_x$ is a straight-chained or branched, optionally substituted C1 to C18 alkyl group,
and no additional extracting agents, at least one metal can be extracted from an aqueous phase, wherein the pH value of the aqueous phase is between 8 and 0.

Another advantage of the inventive process is that by user of the specific ionic liquid of formula (I) according to the present invention, a metal can be selectively extracted from a solution with a mixture of at least two metals. Thereby, one or more metals from a mixture of metals can be separated by extraction. Accordingly, the separation of platinum and nickel, for example, is possible. This process can be applied if, for example, particular metals are to be recycled from a solution with a mixture or toxic metals are to be removed from a mixture. For example, gold, platinum and/or palladium can be sequentially extracted from industrial water by means of the inventive compounds. According to the invention, if applicable, one or more of the inventive compounds are employed. Thereby it is preferred that the ionic liquid mainly only extracts the desired metal in order to achieve an as high as possible efficiency.

Particularly preferred, the desired metal is extracted in a ratio of at least 10:1, 50:1 and preferably 99:1 in relation to the metal not be extracted. The selective extraction intended according to the present invention can also be applied to Pt/Fe mixtures, Ir/Fe mixtures and Ir/Ni mixtures.

According to the inventive process an ionic liquid of formula (I) is used. The ionic liquid of formula (I) consists of cations and anions being selected independently from each other.

It has been found that the ionic liquids of formula (I) are particularly suitable for the purposes of the inventive process if n is a number between 0 and 14 and the nitrogen atom in the imidazolium ring carries an unbranched alkyl chain consisting of from one to 15 carbon atoms. Possible groups are a methyl-, ethyl-, n-propyl-, n-butyl-, n-pentyl-, n-hexyl-, n-heptyl-, n-octyl-, n-nonyl-, n-decyl-, n-undecyl-, n-dodecyl-, n-tridecyl-, n-tetradecyl-, or a n-pentadecyl group. According to a preferred embodiment, n equals 5, 6, 7, 8, 9, 10, 11, 12 or 13 and most preferably 10.

In the ionic liquids claimed for the inventive process, $R^1$ and $R^2$ independently from each other are —H, -halogen, —$NO_2$, —$NH_2$, —$NHR_x$, —$N(R_x)_2$, —$R_x$, —C(O)OH, —C(O)$OR_x$, —C(O)$R_x$ or —$OR_x$, wherein $R_x$ is a straight-chained or branched, optionally substituted C1 bis C18 alkyl group. Herein, halogen may be —F, —Cl, —Br or —I. $R_x$ may be a straight-chained or branched C1 to C18 alkyl group. Possible groups are a methyl-, ethyl-, n-propyl-, iso-propyl-, n-butyl-, sec-butyl-, iso-butyl-oder tert-butyl-gruppe as well as a pentyl-, hexyl-, heptyl-, octyl-, nonyl-, decyl-, undecyl-, dodecyl-, tridecyl-, tetradecyl-, pentadecyl-, hexadecyl-, heptadecyl- or a octadecyl group and the corresponding isomers of each group. In further embodiments, one or more hydrogen atoms of the alkyl group can be substituted by one or more substituents selected from the group comprising -halogen, —$NO_2$, —$NH_2$, —$NHR_x$, —$N(R_x)_2$, —$R_x$, —C(O)OH, —C(O)$OR_x$, —C(O)$R_x$, and —$OR_x$.

$R^1$ and $R^2$ can be neutral groups or groups with +M-effect or –M-effect. In a preferred embodiment, $R^1$ is a group with +M-effect and $R^2$ is a group with –M-effect or neutral group or $R^1$ is a group with –M-effect or neutral group and $R^2$ is a group with +M-effect. In another preferred embodiment, $R^1$ and $R^2$ are neutral groups or groups with a +M-effect. Groups with a +M-effect in the meaning of the present invention are halogen or $OR_x$, preferably OBu, OPr, OEt and OMe and most preferably OEt and OMe. The ionic liquids claimed for the inventive process have no, one or two groups unlike —H. In a particularly preferred embodiment, one substituent is unlike —H. In another preferred embodiment this substituent is -halogen selected from the group comprising —F, —Cl, —Br and —I and most preferably is —Br or —$OR_x$, wherein $R_x$ is a straight-chained or branched, optionally substituted C1 to C 18 alkyl group, preferably methyl, ethyl, propyl, butyl and most preferably methyl or ethyl. This substituent may either may be in the ortho, meta or para position and particularly preferred in the para position.

Preferred embodiments of the ionic liquids claimed for the inventive process and the cations, respectively, are 1-(4-methoxyphenyl)-3-methyl-imidazolium, 1-(2-bromophenyl)-3-methyl-imidazolium, 1-(4-ethylphenyl)-3-methyl-imidazolium, 1-(2-ethylphenyl)-3-methyl-imidazolium, 1-phenyl-3-methyl-imidazolium, 1-(4-ethoxyphenyl)-3-propyl-imidazolium, 1-(4-methoxyphenyl)-3-butyl-imidazolium, 1-(4-ethoxyphenyl)-3-butyl-imidazolium, 1-(2-ethoxyphenyl)-3-butyl-imidazolium, 1-(4-chlorophenyl)-3-butyl-imidazolium, 1-(4-bromophenyl)-3-butyl-imidazolium, 1-(4-ethylphenyl)-3-butyl-imidazolium, 1-(2-ethylphenyl)-3-butyl-imidazolium, 1-(4-ethoxyphenyl)-3-pentyl-imidazolium, 1-phenyl-3-methyl-imidazolium, 1-(4-methoxyphenyl)-3-hexyl-imidazolium, 1-(2-methoxyphenyl)-3-hexyl-imidazolium, 1-(4-ethoxyphenyl)-3-hexyl-imidazolium, 1-(2-ethoxyphenyl)-3-hexyl-imidazolium, 1-(4-chlorophenyl)-3-hexyl-imidazolium, 1-(4-bromophenyl)-3-hexyl-imidazolium, 1-(4-ethylphenyl)-3-hexyl-imidazolium, 1-(2-ethylphenyl)-3-hexyl-imidazolium, 1-phenyl-3-undecyl-imidazolium, 1-(4-methoxyphenyl)-3-undecyl-imidazolium, 1-(2-methoxyphenyl)-3-undecyl-imidazolium, 1-(4-ethoxyphenyl)-3-undecyl-imidazolium, 1-(4-chlorophenyl)-3-undecyl-imidazolium, 1-(4-bromophenyl)-3-undecyl-imidazolium, 1-(2-bromophenyl)-3-undecyl-imidazolium, 1-(4-ethylphenyl)-3-undecyl-imidazolium, 1-(2-ethylphenyl)-3-undecyl-imidazolium, 1-phenyl-3-tetradecyl-imidazolium-(4-methoxyphenyl)-3-tetradecyl-imidazolium, 1-(4-ethoxyphenyl)-3-tetradecyl-imidazolium and 1-(2-bromophenyl)-3-tetradecyl-imidazolium, 1-(4-ethylphenyl)-3-tetradecyl-imidazolium, 1-(2-ethylphenyl)-3-tetradecyl-imidazolium, and most preferably are 1-phenyl-3-undecyl-imidazolium, 1-(4-bromophenyl)-3-undecyl-imidazolium and 1-(4-methoxyphenyl)-3-undecyl-imidazolium.

Particularly suitable ionic liquids for the inventive process are ionic liquids containing as an anion an ion selected from the group comprising hexafluorophosphate, tris(pentafluoroethyl)trifluorophosphate, tris(heptafluoropropyl)trifluorophosphate, phosphates of general formula (II, III or IV), tetracyanoborate, sulfonates of general formula (V), sulfates of general formula (VI), carboxylates of general formula (VII), tricyanomethane, dicyanamide, imides of general formula (VIII), bis(fluorosulfonyl)-imide, sulfonimides of general formula (IX), tetrasubstituted borates of general formula (X), tetrafluoroborat and bis[oxalato(2-)—O,O'] borate, wherein the groups $R_3$ to $R_{20}$ comprise a carbon-containing organic, saturated or unsaturated, acyclic or cyclic, aliphatic or aromatic group with 1 to 20 carbon atoms which may contain one or more hetero atoms and/or which may be substituted by one or more functional groups or fluorine.

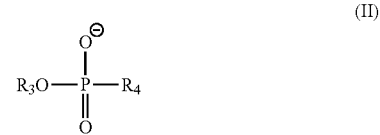

(II)

(III)

(IV)

(V)

(VI)

(VIII)

(VII)

(IX)

-continued

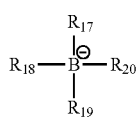

In a preferred embodiment of the inventive process, the ionic liquid contains an anion selected from the group comprising formula (IX) and dicyanamide. In a particularly preferred embodiment, the anion is bis(trifluoromethylsulfonyl)imide or dicyanamide.

Particularly preferred embodiments of the ionic liquid claimed for the inventive process are 1-(4-bromophenyl)-3-undecyl-imidazoliumbis(trifluoromethylsulfon)imide, 1-phenyl-3-undecyl-imidazolium and 1-(4-methoxyphenyl)-3-undecyl-imidazoliumbis(trifluoromethylsulfon)imide.

In a preferred embodiment of the inventive process, the ionic liquids preferably have melting points of below 90° C., more preferably below 50° C., still more preferably below 30° C. and most preferably below 10° C. In general, any ionic liquid of the above-mentioned criteria being stable at the respective process temperature and at the respective process pressure is suitable for the use in the inventive process.

In another preferred embodiment, the ionic liquids suitable for the inventive process have a decomposition temperature of above 100° C., preferably above 200° C., still more preferably above 300° C. and most preferably above 320° C.

By choosing suitable cations and anions, the properties of the ionic liquids can be specifically adjusted. In the inventive process, cations and anions of the ionic liquid are selected such that they correspond to the requirements with respect to melting point, decomposition temperature, viscosity and hydrophobicity. The selection of suitable cations and anions can be made by the skilled person.

An ionic liquid of general formula (I), wherein $X^-$ is an anion, n is a number from 0 to 14 and $R^1$ and $R^2$ independently from each other are —H, -halogen, —$NO_2$, —$NH_2$, —$NHR_x$, —$N(R_x)_2$, —$R_x$, —C(O)OH, —C(O)O$R_x$, —C(O)$R_x$ and —O$R_x$, wherein $R_x$ is a straight-chained or branched, optionally substituted C1 bis C18 alkyl group for use in the inventive process, wherein no additional extracting agents are used and the pH value of the aqueous phase is between 8 and 0, also forms part of the invention.

In the inventive process no additional extracting agents are used. For example, azo/imine functionalities in combination with an aromatic hydroxy group in the ortho position which may function as a metal chelate group are not used. Examples for this are, e.g., PAN (1-(pyridylazo)-2-naphtol), TAN (1-(thiazolylazo)-2-naphtol) or 1-butyl-3-[3-(2-hydroxybenzylamino)propyl]-3H-imidazol-1-ium-bis(trifluoromethane)sulfonimide. Likewise, crown ether groups and cryptands, e.g., 18-crown-6 ether, are not used. Furthermore, organic compounds carrying, for example, urea or thiourea groups and which complex metals, are not used. This list of extracting agent is not meant to be completed and merely serves for clarification purposes.

The ionic liquids according to formula (I) are added to the aqueous phase to be purified which contains metals to be extracted. In another embodiment of the inventive process both, the ionic liquid can be added to the aqueous phase and the aqueous phase can be added to the ionic liquid. Both liquids can also be admixed in a third vessel at the same time. Upon addition, both phases can be liquid, one phase can be liquid and the second one can be solid or both phases can be solid. After liquefaction, the process can be carried out according to the invention.

The ionic liquids suitable for the inventive process are a hydrophobic and not soluble in the aqueous phase, whereby a 2-phase mixture is formed. Thereby, the ionic liquid may be in the lower phase and the aqueous phase may be above or the ionic liquid may be in the upper phase above the aqueous phase.

Subsequently, both liquids are mixed, whereby the metal is extracted from the aqueous phase by means of the ionic liquid. In a preferred embodiment, mixing is performed by mechanical agitation (shaking or stirring) or ultrasound. In order to achieve good mixing of both phases, the viscosity of the ionic liquid must not be too high. If the viscosity is too high, dilution of the ionic liquid with a solvent is possible. Thereby, the solvent must not be soluble in the aqueous phase. Suitable solvents are, for example, trichloromethane, trichloroethane, methylethyl ketone, dichloromethane, butyl acetate or n-butanol, however, also other solvents may be employed in the inventive process provided that they fulfill the mentioned requirements. In a particularly preferred embodiment no additional solvent is used.

After finishing the mixing, the emulsion again separates into two phases, whereby both solutions can be separated. The metal now can be found in the ionic liquid and no longer in the aqueous phase. In a preferred embodiment, the separation of the emulsion can be performed without external influence or with external influence, for example by centrifugation.

One possibility to extract metals from the ionic liquid is provided by electrochemical precipitation. A suitable process in this respect is described in EP 1 951 934.

EXAMPLES

Measuring Methods $^1$H and $^{13}$C NMR spectra are recorded with Bruker DRX-300 at 300.13 and 75.453 MHz. The deuterated solvent serves as an internal reference. Elementary analyses are determined by the micro-analytical laboratory of the institute with a Euro Vektor Euro EA-3000 device. Melting points of compounds are determined either by a PolyTherm A melting point device from Wagner and Mulz or, in case of liquid samples, with a Mettler-Toledo DSC device. A Netzsch STA 409 device serves to measure the thermic stability (TGA). The measurements are performed under open-air conditions with a scan rate of 10 K/min in a temperature range from 30 to 500° C.

The concentration of cations was determined by ICP-MS with a ELAN 9000 from Perkin Elmer SCIEX company. For this purpose, the samples are diluted by 1:1000 in 1% $HNO_3$ and the metal content was determined in a triple determination using a calibration curve (5, 10, 20 and 50 µg/L metal in 1% $HNO_3$). CertPrep standards (1 g/L), a SPS-SW2 standard and Rh as internal standard with 5 µg/L are used as the standards. The concentration is determined at 2 hours after each addition of the ionic liquid to the solution.

The pH values of the aqueous solutions are measured by a HACH sension2 gel-filled electrode.

Example 1

Extraction Ratios of Some Ionic Liquids

For measuring the partition of metal ions between the aqueous phase and the ionic liquid, 30 mL of an aqueous potassium tetrachloroplatinate solution (0.1 mmol/L) are contacted with 100 µL of ionic liquid. The mixture is kept in agitation for 2 hours by use of a Vibramax 100 from Heidolph at 1200 rpm. After a certain time interval, samples are taken from the aqueous phase and contacted with each 10

µL of concentrated $HNO_3$ (this serves to stabilize Pt in the solution). The concentration of cations is determined by ICP-MS.

TABLE 1

Platinum extraction ratios E in % of different ionic liquids; $R^1$ is in the ortho position and $R^2$ is in the para position, the anion is bis(trifluoromethylsulfonyl)imide

| $R^1$ | $R^2$ | n = 0 | n = 2 | n = 3 | n = 4 | n = 5 | n = 10 | n = 13 |
|---|---|---|---|---|---|---|---|---|
| H | H | | | 52.3 | | 27.6 | >96.1 | 29 |
| H | OMe | 26.6 | | 26.4 | | 12.3 | 95.5 | 54.0 |
| OMe | H | | | | | 12.0 | 35.4 | 14.5 |
| H | OEt | | 12.7 | 15.5 | 3.8 | 27.9 | 75.0 | 19.5 |
| OEt | H | | | 31.9 | | 22.9 | 93.5 | 18.2 |
| H | Cl | | | 27.0 | | 40.0 | 50.0 | |
| H | Br | | | 34.2 | | 62.1 | 96.5 | |
| Br | H | 27.5 | | | | | 29.0 | 12.0 |
| H | Et | 45.0 | | 21.3 | | 24.1 | 74.7 | 30 |
| Et | H | 44.0 | | 42.9 | | 23.8 | 61.9 | 33 |
| OMe | $NO_2$ | | | | | | 66.6 | |

TABLE 2

Platinum extraction ratios E in % of an ionic liquid; $R^1$ is in the ortho position and $R^2$ is in the para position, the anion is dicyanamide

| $R^1$ | $R^2$ | n = 0 | n = 2 | n = 3 | n = 4 | n = 5 | n = 10 | n = 13 |
|---|---|---|---|---|---|---|---|---|
| H | OMe | | | | | | 91.1 | |

The examined ionic liquids show very good extraction ratios. In particular, ionic liquids are particularly suitable for the platinum extraction where n=10 as they can extract more than 90% of Pt from the aqueous phase. If one compares the ionic liquid having dicyanamide as an ion with the corresponding ionic liquid having bis(trifluoromethylsulfonyl) imide as the ion, one recognizes that both ionic liquids show similarly good extraction ratios which suggests that both anions are well suitable for the intended process.

Example 2

Partition Ratio D of Some Ionic Liquids

For measuring the partition of metal ions between the aqueous phase and the ionic liquid, 30 mL of an aqueous potassium tetrachloroplatinate solution (0.1 mmol/L) are contacted with 100 µL of ionic liquid. The mixture is kept in agitation for 2 hours by use of a Vibramax 100 from Heidolph at 1200 rpm. After a certain time interval, samples are taken from the aqueous phase and contacted with each 10 µL of concentrated $HNO_3$ (this serves to stabilize Pt in the solution). The concentration of cations is determined by ICP-MS.

TABLE 3

Platinum partition ratios D of different ionic liquids; $R^1$ is in the ortho position and $R^2$ is in the para position, the anion is bis(trifluoromethylsulfonyl)imide

| $R^1$ | $R^2$ | n = 0 | n = 2 | n = 3 | n = 4 | n = 5 | n = 10 | n = 13 |
|---|---|---|---|---|---|---|---|---|
| H | H | | | 1.232 | | 0.414 | 184.357 | 0.454 |
| H | OMe | 0.399 | | 0.389 | | 0.151 | 109.7 | 1.345 |
| OMe | H | | | | | 0.148 | 0.598 | 0.183 |
| H | OEt | | 0.157 | 0.198 | 0.043 | 0.420 | 3.614 | 0.257 |
| H | Cl | | | 0.396 | | 0.723 | 1.116 | |
| H | Br | | | 0.568 | | 1.877 | 1570.3 | |
| Br | H | 0.413 | | | | | 0.442 | 0.148 |

TABLE 3-continued

Platinum partition ratios D of different ionic liquids; $R^1$ is in the ortho position and $R^2$ is in the para position, the anion is bis(trifluoromethylsulfonyl)imide

| $R^1$ | $R^2$ | n = 0 | n = 2 | n = 3 | n = 4 | n = 5 | n = 10 | n = 13 |
|---|---|---|---|---|---|---|---|---|
| H | Et | 0.916 | | 0.294 | | 0.344 | 3.548 | 0.458 |
| Et | Ht | 0.864 | | 0.828 | | 0.338 | 1.851 | 0.525 |

Many of the examined the ionic liquids show very good partition ratios. In particular, ionic liquids are particularly suitable for the platinum extraction where n=10 and, hence, carrying an undecyl chain.

Example 3

Extraction Ratios at Different pH Values

For examining the pH dependency of the extraction of platinum from an aqueous potassium tetrachloroplatinate solution (0.1 mmol/L) by 1-(4-bromophenyl)-3-undecyl-imidazoliumbis(trifluoromethylsulfonyl)imide and 1-(4-ethoxyphenyl)-3-undecyl-imidazoliumbis(trifluoromethylsulfonyl)imide, different aqueous solutions with defined pH values are provided. Each 30 mL of the aqueous solution are contacted with 100 µL of ionic liquid and kept in agitation for 2 hours by use of a Vibramax 100 from Heidolph at 1200 rpm. After a certain time interval, samples are taken from the aqueous phase and contacted with each 10 µL of concentrated $HNO_3$ (this serves to stabilize Pt in the solution). The concentration of cations is determined by ICP-MS.

TABLE 4

Extraction ratios E in % at different pH values for 1-(4-bromophenyl)-3-undecyl-imidazoliumbis(trifluoromethylsulfonyl)imide and 1-(4-ethoxyphenyl)-3-undecyl-imidazoliumbis(trifluoromethylsulfonyl)imide

| 1-(4-bromophenyl)-3-undecyl-imidazoliumbis(trifluoromethylsulfonyl)imide | | 1-(4-ethoxyphenyl)-3-undecyl-imidazoliumbis(trifluoromethylsulfonyl)imide | |
|---|---|---|---|
| pH | E % | pH | E % |
| 7.2 | 85.1 | 7.2 | 75 |
| 2.6 | 73.7 | 2.6 | 51 |
| 2.1 | 63.0 | — | — |
| 1.2 | 61.1 | 1.2 | 40 |

The inventive extraction is possible not only in the neutral range but also in the acidic range. This can be gathered from table 4, the extraction performance decreases by 47% for 1-(4-ethoxyphenyl)-3-undecyl-imidazoliumbis(trifluoromethylsulfonyl)imide and by not even 29% for 1-(4-bromophenyl)-3-undecyl-imidazoliumbis(trifluoromethylsulfonyl)imide. Therefore, one can argue for a stable extraction performance over the whole pH range.

Example 4

Extraction of Different Metals

For examining the extraction of further metals, iridium and europium are extracted exemplarily from an aqueous solution having a 0.1 mmol/L concentration of each metal ($IrCl_3$ and $EuCl_3$, respectively) by 1-(4-bromophenyl)-3-undecylimidazoliumbis-(trifluoromethylsulfonyl)imide. For this purpose, two different aqueous solutions (pH approx. 6.9) are provided and to each 30 mL of aqueous solution are added 100 μL of ionic liquid. The mixtures are kept in agitation for 2 hours by use of a Vibramax 100 from Heidolph at 1200 rpm. After a certain time interval, samples are taken from the aqueous phase and contacted with each 10 μL of concentrated $HNO_3$ (this serves to stabilize Pt in the solution). The concentration of cations is determined by ICP-MS.

TABLE 5

Extraction ratio E in % for 1-(4-bromophenyl)-3-undecyl-imidazoliumbis(trifluoromethylsulfonyl)imide

| Solution | E % |
|---|---|
| $IrCl_3$ solution | 75 |
| $EuCl_3$ solution | 61 |

Table 5 shows that not only platinum but also other metals may be extracted with the inventive process. Furthermore, it becomes apparent that the inventive process may not only be applied to heavy metals, such as iridium, but also shows very good results for the extraction of rare earths and actinides as, for example, europium.

Example 5

Selective Extraction (I)

For examining the selective metal extraction, an aqueous solution containing a mixture of nickel nitrate and potassium hexachloroplatinate with a metal concentration of each 0.1 mmol/L is provided. The pH value of the solution is approx. 6.9. 30 mL of this solution is contacted with 100 μL of 1-(4-bromophenyl)-3-undecyl-imidazoliumbis(trifluoromethylsulfonyl)imide. The mixture is kept in agitation for 2 hours by use of a Vibramax 100 from Heidolph at 1200 rpm. After a certain time interval, samples are taken from the aqueous phase and contacted with each 10 μL of concentrated $HNO_3$ (this serves to stabilize Pt in the solution). The concentration of cations is determined by ICP-MS

TABLE 6

Extraction ratios E in % for 1-(4-bromophenyl)-3-undecyl-imidazolium-bis(trifluoromethylsulfonyl)imide with a mixture of Ni and Pt salts

| Metal | E % |
|---|---|
| Pt | 96.1 |
| Ni | 0 |

Table 6 clearly shows that the inventive process allows for a selective extraction. From a mixture of platinum and nickel, only platinum is extracted with an extraction ratio of 96.1%, whereas nickel remains in the aqueous phase.

Example 6

Selective Extraction (II)

For examining the selective metal extraction, 3 different metal salt solutions are provided each containing nickel nitrate, iron trichloride or iridium trichloride with a metal salt concentration of each 0.1 mmol/L. The pH value of the solutions in 6.9. Each 30 mL of these mixtures are each contacted with 100 μL of 1-(4-bromophenyl)-3-undecyl-imidazoliumbis(trifluoromethylsulfonyl)imide or 1-(4ethoxyphenyl)-3-undecyl-imidazoliumbis(trifluoromethylsulfonyl)imide. The mixtures are kept in agitation for 2 hours by use of a Vibramax 100 from Heidolph at 1200 rpm. After a certain time interval, samples are taken from the aqueous phase and contacted with each 10 μL of concentrated $HNO_3$. The concentration of cations is determined by ICP-MS.

TABLE 7

Extration ratios E in % for 1-(4-bromphenyl)-3-undecyl-imidazoliumbis(trifluoromethylsulfonyl)imide and 1-(4-ethoxyphenyl)-3-undecyl-imidazoliumbis(trifluormethyl-sulfonyl)imide

| Metal | 1-(4-bromphenyl)-3-undecyl-imidazoliumbis(trifluoro-methylsulfonyl)imide E % | 1-(4-ethoxyphenyl)-3-undecyl-imidazoliumbis(trifluoro-methylsulfonyl)imide E % |
|---|---|---|
| Fe | 6.4 | 0 |
| Ni | 0.1 | 1.1 |
| Ir | 75.0 | 66.0 |

Table 7 clearly shows that the tested ionic liquids selectively remove iridium from the aqueous phase, whereas iron and nickel remain in the aqueous solution. Therefore, the inventive process allows for the separation of, for example, iridium from a mixture of iridium, iron and nickel salts.

Example 7

Selective Extraction from Industrial Waste Water (III)

For examining the selective metal extraction from industrial water, industrial water containing the following metals is used: Ag, Al, Au, Ca, Cu, Fe, Ir, Mg, Ni, Pb, Pd, Pt, Rh, Si, Sn, Zn. The industrial water is strongly acidic with a pH value of 0.41. 30 mL of the industrial waste water is contacted with 100 μL of an ionic liquid (IL) and agitated with a GFL 3005 shaker at 300 rpm at room temperature. Shortly after addition of the IL to the industrial water and after an incubation period of 2 hours, samples are taken from the aqueous phase. A blank is monitored in parallel to the samples. The following ionic liquids are used in the experiment: 1-(4-methoxyphenyl)-3-undecyl-imidazoliumbis(trifluoromethylsulfonyl)imide, 1-(4-bromophenyl)-3-undecyl-imidazoliumbis(trifluoromethylsulfonyl)imide, 1-(2-methoxy-4-nitrophenyl)-3-undecyl-imidazoliumbis(trifluoromethylsulfonyl)imide and, for comparison, the commercially available ionic liquid 1-butyl-3-methyl-imidazoliumbis(trifluoromethylsulfonyl)imide [BMIM][N(Tf)$_2$]. In contrast to the inventive ionic liquids, [BMIM][N(Tf)$_2$] dissolves completely in the aqueous phase. A separation cannot be observed. For the inventive ionic liquids, a colour change from originally yellow-brown shades into darker brown shades can be observed.

TABLE 8

Extraction results for different ionic liquids from acidic industrial waters (in mg/l)

| | 1-(2-methoxy-4-nitrophenyl)-3-undecyl-imidazoliumbis- | 1-(4-methoxyphenyl)-3-undecyl-imidazoliumbis-(trifluoromethylsulfonyl)- | 1-(4-bromphenyl)-3-undecyl-imidazoliumbis-(trifluoromethylsulfonyl)- |
|---|---|---|---|

TABLE 8-continued

Extraction results for different ionic liquids from acidic industrial waters (in mg/l)

| | (trifluoromethylsulfonyl)imide | | imide | | imide | |
|---|---|---|---|---|---|---|
| Element | 0 h | 2 h | 0 h | 2 h | 0 h | 2 h |
| Mg | 2.4 | 2.4 | 2.3 | 2.3 | 2.4 | 2.4 |
| Al | 10.6 | 10.2 | 10.7 | 10.4 | 10.7 | 10.6 |
| Si | 4.0 | 3.1 | 4.8 | 3.7 | 4.0 | 4.5 |
| Ca | 12.9 | 12.5 | 12.5 | 12.2 | 12.5 | 12.5 |
| Fe | 41.2 | 39.7 | 40.8 | 40.4 | 40.7 | 40.6 |
| Ni | 9.8 | 9.8 | 10.0 | 10.0 | 9.8 | 9.9 |
| Cu | 1960 | 1950 | 1980 | 1965 | 1965 | 1950 |
| Zn | 2.0 | 2.0 | 2.1 | 2.0 | 2.1 | 2.0 |
| Rh | 7.5 | 7.5 | 7.6 | 7.4 | 7.7 | 7.4 |
| Pd | 60.0 | 57.4 | 55.2 | 54.7 | 55.4 | 37.1 |
| Ag | 0.7 | 0.7 | 0.7 | 0.7 | 0.7 | 0.3 |
| Sn | 1.8 | 1.8 | 1.8 | 1.8 | 1.8 | 1.8 |
| Ir | 0.03 | 0.03 | 0.03 | 0.03 | 0.03 | 0.03 |
| Pt | 50.6 | 46.0 | 51.4 | 40.5 | 51.7 | 14.4 |
| Au | 28.9 | 12.0 | 18.4 | 13.0 | 27.3 | 2.0 |
| Pb | 62.0 | 62.2 | 62.2 | 63.0 | 59.8 | 62.7 |

| | Blank | | 1-butyl-3-methyl-imidazoliumbis-(trifluoromethylsufonyl)-imide | |
|---|---|---|---|---|
| Element | 0 h | 2 h | 0 h | 2 h |
| Mg | 2.4 | 2.3 | 2.4 | 2.4 |
| Al | 10.6 | 10.5 | 10.5 | 10.5 |
| Si | 4.8 | 3.6 | 4.2 | 3.6 |
| Ca | 12.5 | 12.5 | 12.1 | 12.7 |
| Fe | 40.4 | 40.4 | 40.5 | 40.3 |
| Ni | 9.9 | 9.8 | 9.8 | 10.0 |
| Cu | 1950 | 1965 | 1950 | 1985 |
| Zn | 2.1 | 2.0 | 2.1 | 2.0 |
| Rh | 7.8 | 7.4 | 7.7 | 7.6 |
| Pd | 61.5 | 60.6 | 60.0 | 60.9 |
| Ag | 0.7 | 0.7 | 0.7 | 0.7 |
| Sn | 1.8 | 1.8 | 1.8 | 1.8 |
| Ir | 0.03 | 0.03 | 0.03 | 0.03 |
| Pt | 53.6 | 52.9 | 53.1 | 54.0 |
| Au | 41.9 | 41.8 | 40.6 | 42.9 |
| Pb | 62.1 | 60.8 | 60.7 | 62.1 |

If one compares the conventional ionic liquid [BMIM][N(Tf)$_2$] with the blank, it can be observed that it is completely inactive with respect to metal extraction from strongly acidic industrial water. In contrast thereto, the inventive ionic liquids also show activity in a strongly acidic environment. Therefore, with 1-(2-methoxy-4-nitrophenyl)-3-undecyl-imidazoliumbis(trifluoromethylsulfonyl)imide one can extract Au, with 1-(4-methoxyphenyl)-3-undecyl-imidazoliumbis(trifluoromethylsulfonyl)imide one can extract Au and Pt and with 1-(4-bromophenyl)-3-undecyl-imidazoliumbis(trifluoromethylsulfonyl)imide one can extract Au, Pt and Pf. One can imagine to use this selectivity for a separation of metals in an extraction cascade. By using 1-(2-methoxy-4-nitrophenyl)-3-undecyl-imidazoliumbis(trifluoromethylsulfonyl)imide it is possible to separate Au followed by 1-(4-methoxyphenyl)-3-undecyl-imidazoliumbis(trifluoromethylsulfonyl)imide (separation of Pt) and 1-(4-bromophenyl)-3-undecyl-imidazoliumbis(trifluoromethylsulfonyl)imide (separation of Pd).

Synthesis of the Used Ionic Liquids

1-Phenyl-3-butyl-1H-imidazoliumbis(trifluoromethyl)sulfonylimide ($C_{15}H_{17}F_6N_3O_4S_2$, 481.434 g/mol)

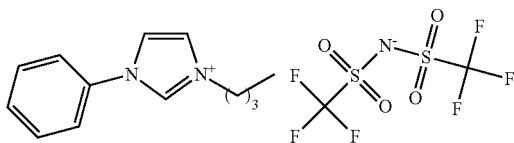

2.74 g (8.4 mmol) 1-Phenyl-3-butylimidazoliumiodide and 2.88 g (10 mmol) lithium bis(trifluoromethylsulfonyl)amide are dissolved in 100 mL methanol-water mixture and contacted with 10 mL dichloromethane. The reaction mixture was stirred at room temperature for 24 hours and the organic phase is separated subsequently. After removal of the solvent, an oily liquid was obtained (97% yield, 3.9 g).

Thermic stabilty: decomposition onset: 305° C., inflection point: 435° C.

$^1$H-NMR (300 MHz, CDCl$_3$, ppm): 9.00 (1H, s, NCHN), 7.59 (1H, m, NCHC), 7.49 (6H, m, CH arom., NCHC), 4.22

(2H, t, J=7.6 Hz, N—CH$_2$), 1.84 (2H, m, CH$_2$), 1.34 (2H, m, CH$_2$), 0.89 (3H, t, J=7.2 Hz, CH$_3$)

$^{13}$C-NMR (75.5 MHz, CDCl$_3$, ppm): 134.2 (C), 133.8 (NCHN), 130.5 (CH), 123.4 (CH), 122.0 (CH), 121.7 (CH), 50.4 (CH$_2$), 31.9 (CH$_2$), 19.3 (CH$_2$), 13.2 (CH$_3$)

Elementary analysis (C$_{15}$H$_{17}$F$_6$N$_3$O$_4$S$_2$):
calcd.: C, 37.42%, H, 3.56%, N, 8.73%, S, 13.32%.
found: C, 37.59%, H, 3.61%, N, 8.94%, S, 12.91%.

1-Phenyl-3-hexyl-1H-imidazoliumbis(trifluoromethyl)sulfonylimide (C$_{17}$H$_{21}$F$_6$N$_3$O$_4$S$_2$, 509.487 g/mol)

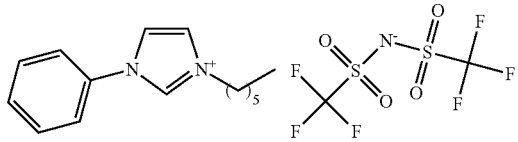

3.42 g (9.6 mmol) 1-phenyl-3-hexylimidazoliumiodide and 3.31 g (11.5 mmol) lithium bis(trifluoromethylsulfonyl)amide are dissolved in 100 mL methanol-water mixture and contacted with 10 mL dichloromethane. The reaction mixture was stirred at room temperature for 24 hours and the organic phase is separated subsequently. After removal of the solvent, an oily liquid was obtained (yield 98%, 4.81 g).

Thermic stabilty: decomposition onset: 308° C., inflection point: 440° C.

$^1$H-NMR (300 MHz, CDCl$_3$, ppm): 9.01 (1H, s, NCHN), 7.59 (1H, m, NCHC), 7.49 (6H, m, CH arom., NCHC), 4.22 (2H, t, J=7.7 Hz, N—CH$_2$), 1.86 (2H, m, CH$_2$), 1.25 (6H, m 3xCH$_2$), 0.79 (3H, t, J=6.9 Hz, CH$_3$)

$^{13}$C-NMR (75.5 MHz, CDCl$_3$, ppm): 134.3 (C), 133.8 (NCHN), 130.6 (CH), 123.3 (CH), 122.0 (CH), 121.9 (CH), 121.7 (CH), 50.6 (CH$_2$), 30.9 (CH$_2$), 29.9 (CH$_2$), 25.7 (CH$_2$), 22.2 (CH$_2$), 13.8 (CH$_3$)

Elementary analysis (C$_{17}$H$_{21}$F$_6$N$_3$O$_4$S$_2$):
calcd.: C, 40.08%, H, 4.15%, N, 8.25%, S, 12.59%.
found: C, 40.16%, H, 3.81%, N, 8.37%, S, 12.68%.

1-Phenyl-3-undecyl-1H-imidazoliumbis(trifluoromethyl)sulfonylimide (C$_{22}$H$_{31}$F$_6$N$_3$O$_4$S$_2$, 579.619 g/mol)

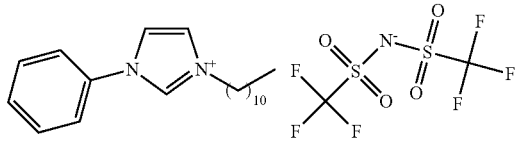

5.76 g (13.5 mmol) 1-phenyl-3-undecylimidazoliumiodide and 4.65 g (16.2 mmol) lithium bis(trifluoromethylsulfonyl)amide are dissolved in 100 mL methanol-water mixture and contacted with 10 mL dichloromethane. The reaction mixture was stirred at room temperature for 24 hours and the organic phase is separated subsequently. After removal of the solvent, an oily liquid was obtained (yield 79%, 6.2 g).

$^1$H-NMR (300 MHz, CDCl$_3$, ppm): 9.12 (1H, s, NCHN), 7.60 (1H, m, NCHC), 7.50 (6H, m, NCHC, CH arom.), 4.25 (2H, t, J=7.7 Hz, N—CH$_2$), 1.87 (2H, m, CH$_2$), 1.22 (16H, m, 8xCH$_2$), 0.79 (3H, t, J=6.8 Hz, CH$_3$)

$^{13}$C-NMR (75.5 MHz, CDCl$_3$, ppm): 134.3 (NCHN), 133.9 (C), 130.6 (CH), 123.3 (CH), 122.0 (CH), 121.6 (CH), 50.7 (N—CH$_2$), 31.8 (CH$_2$), 30.1 (CH$_2$), 29.5 (CH$_2$), 29.4 (CH$_2$), 29.3 (CH$_2$), 29.2 (CH$_2$), 28.8 (CH$_2$), 26.1 (CH$_3$)

Elementary analysis (C$_{22}$H$_{31}$F$_6$N$_3$O$_4$S$_2$.0.25 EtOAc):
calcd.: C, 25.93%, H, 5.53%, N, 6.97%, S, 10.64%.
found: C, 46.16%, H, 4.87%, N, 6.97%, S, 9.63%.

1-Phenyl-3-tetradecyl-1H-imidazoliumbis(trifluoromethyl)sulfonylimide (C$_{25}$H$_{37}$F$_6$N$_3$O$_4$S$_2$, 621.699 g/mol)

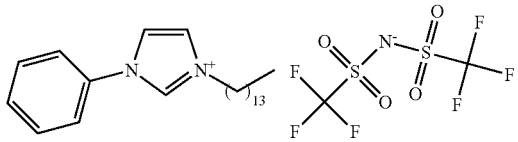

2.11 g (5 mmol) 1-phenyl-3-tetradecylimidazoliumbromide and 1.72 g (6 mmol) lithium bis(trifluoromethylsulfonyl)amide are dissolved in 30 mL of methanol-water mixture and contracted with 10 mL of dichloromethane. The reaction mixture was stirred at room temperature for 24 hours and the organic phase is separated subsequently. After removal of the solvent, an oily liquid was obtained (yield 93%, 2.89 g).

$^1$H-NMR 300 MHz, CDCl$_3$, ppm): 9.01 (1H, s, NCHN), 7.60 (1H, t, J=1.9 Hz, NCHC), 7.49 (6H, m, NCHC, CH arom.), 4.23 (2H, t, J=7.6 Hz, N—NC$_2$), 1.86 (2H, m, CH$_2$), 1.22 (22H, m, 11xCH$_2$), 0.79 ppm (3H, t, J=6.9 Hz, CH$_3$)

$^{13}$C-NMR (75.5 MHz, CDCl$_3$, ppm): 134.4 (C arom.), 133.9 (NCHN), 130.6 (CH), 123.3 (CH), 122.1 (CH), 121.7 (CH), 50.7 (N—CH$_2$), 31.9 (CH$_2$), 30.1 (CH$_2$), 29.6 (CH$_2$), 29.5 (CH$_2$), 29.4 (CH$_2$), 29.3 (CH$_2$), 28.9 (CH$_2$), 26.1 (CH$_2$), 22.6 (CH$_2$), 14.1 (CH$_3$)

Elementary analysis (C$_{25}$H$_{37}$F$_6$N$_3$O$_4$S$_2$):
calcd.: C, 48.30%, H, 6.00%, N, 6.76%, S, 10.32%.
found: C, 48.48%, H, 6.26%, N, 6.94%, S, 10.20%.

1-(4-Methoxyphenyl)-3-methyl-1H-imidazoliumbis(trifluoromethyl)sulfonylimide (C$_{13}$H$_{13}$F$_6$N$_3$O$_5$S$_2$, 469.379 g/mol)

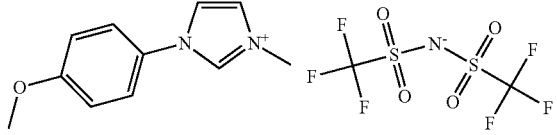

8.68 g (0.027 mol) 1-(4-methoxyphenyl)-3-methylimidazoliumiodide and 7.8 g (0.027 mol) lithium bis(triflouoromethylsulfonyl)amide are dissolved in 160 mL water and 25 mL dichloromethane are added. After stirring for 1 hour at room temperature, the organic phase is separated and concentrated on the rotary evaporator. The liquid product is obtained in 100% yield.

Thermic stabilty: decomposition onset: 305° C., inflection point: 460° C.

$^1$H-NMR (300 MHz, d$^6$-DMSO, ppm): 9.63 (1H, s, NCHN), 8.20 (1H, m, NCCH), 7.91 (1H, m, NCCH), 7.66 (2H, m, CH arom.), 7.21 (2H, m, CH arom.), 3.93 (3H, s, N—CH$_3$), 3.85 (3H, s, OCH$_3$)

$^{13}$C-NMR (75.5 MHz, d$^6$-DMSO, ppm): 160.0 (C arom.), 135.7 (NCHC), 127.9 (C arom.), 124.2 (CH), 123.5 (2CH), 121.3 (CH), 115.2 (2CH), 55.7 (Ar—OCH3), 36.0 (N—CH$_3$)

Elementary analysis ($C_{13}H_{13}F_6N_3O_5S_2$)
calcd.: C, 33.26%, H, 2.79%, N, 8.95%, S, 13.66%.
found: C, 33.08%, H, 2.77%, N, 8.83%, S, 13.70%.

1-(4-Methoxyphenyl)-3-butyl-1H-imidazoliumbis(trifluoromethyl)sulfonylimide ($C_{16}H_{19}FN_3O_5S_2$, 511.459 g/mol)

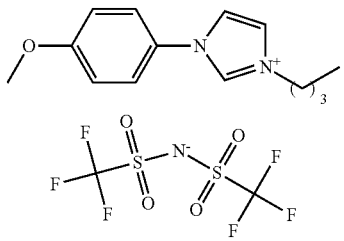

9.69 g (0.027 mol) 1-(4-methoxyphenyl)-3-butyl-1H-imidazoliumiodide and 9.32 g lithium bis(trifluoromethylsulfonyl)amide are dissolved in 160 mL water and 25 mL dichloromethane are added. After stirring for 20 hours at room temperature, the organic phase is separated and concentrated on the rotary evaporator. The liquid product is obtained in 100% yield.

Thermic stabilty: decomposition onset: 289° C., inflection point: 460° C.

$^1$H-NMR (300 MHz, d$^6$-DMSO, ppm): 9.72 (m, 1 H, NCHN), 8.24 (m, 1 H, NCHC), 8.02 (m, 1 H, NCHC), 7.72 (d, J=9 Hz, 2 H, arom. CH), 7.21 (d, J=9 Hz, 2 H, arom. CH), 4.25 (t, J=7.2 Hz, 2 H, N—CH$_2$), 3.86 (s, 3 H, OCH$_3$), 1.89 (m, 2 H, CH$_2$), 1.35 (m, 2 H, CH$_2$), 0.95 (t, J=7.4 Hz, 3 H, CH$_3$)

$^{13}$C-NMR (75.5 MHz, d$^6$-DMSO, ppm): 160.0 (arom. C), 135.1 (arom. CH), 127.9 (arom. C), 123.5 (arom. CH), 123.1 (arom. CH), 121.6 (arom. CH), 115.1 (arom. CH), 55.7 (OCH$_3$), 49.1 (N—CH$_2$), 31.1 (CH$_2$), 18.9 (CH$_2$), 13.2 (CH$_3$)

Elementary analysis ($C_{16}H_{19}FN_3O_5S_2$)
calcd.: C, 37.57%, H, 3.74%, N, 8.22%, S, 12.54%.
found: C, 37.69% H, 3.54% N, 8.53%, S, 12.50%.

1-(4-Methoxyphenyl)-3-hexyl-1H-imidazoliumbis(trifluoromethyl)sulfonylimide ($C_{18}H_{23}F_6N_3O_5S_2$, 539.513 g/mol)

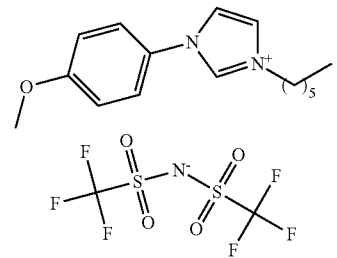

13.25 g (0.036 mol) 1-(4-methoxyphenyl)-3-hexyl-1H-imidazoliumbromide and 13.45 g lithium bis(trifluoromethylsulfonyl)amide are dissolved in 160 mL water and 25 mL dichloromethane are added. After stirring for 20 hours at room temperature, the organic phase is separated and concentrated on the rotary evaporator. The liquid product is obtained in 100% yield.

Thermic stabilty: decomposition onset: 314° C., inflection point: 460° C.

$^1$H-NMR (300 MHz, d$^6$-DMSO, ppm): 9.71 (1H, s, NCHN), 8.24 (1H, m, NCHC), 8.02 (1H, m, NCHC), 7.72 (2H, d, J=9 Hz, CH arom.), 7.21 (2H, d, J=9 Hz, CH arom.), 4.24 (2H, q, J=7 Hz, N—CH$_2$), 3.86 (3H, s, OCH$_3$), 1.90 (2H, m, CH$_2$), 1.33 (6H, m, 3xCH$_2$), 0.89 (3H, m, CH$_3$)

$^{13}$C-NMR (75.5 MHz, d$^6$-DMSO): 160.0 (C-Aromat), 135.0 (NCHN), 127.9 (C arom.), 123.5 (2CH), 123.1 (CH), 121.5 (CH), 115.1 (2CH), 55.7 (OCH$_3$), 49.3 (N—CH$_2$), 30.6 (CH$_2$), 29.12 (CH$_2$), 25.2 (CH$_2$), 21.8 (CH$_2$), 13.8 (CH$_3$)

Elementary analysis ($C_{18}H_{23}F_6N_3O_5S_2$)
calcd.: C, 40.07%, H, 4.30%, N, 7.79%, S, 11.89%.
found: C, 39.91%, H, 4.45%, N, 7.71%, S, 11.71%.

1-(4-Methoxyphenyl)-3-undecyl-1H-imidazoliumbis(trifuluoromethyl)sulfonylimide ($C_{23}H_{33}F_6N_3O_5S_2$, 609.646 g/mol)

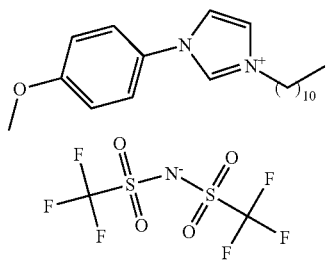

2.861 g (6.26 mmol) 1-(4-methoxyphenyl)-3-undecyl-1H-imidazoliumiodide and 2.16 g lithium bis(trifluoromethylsulfonyl)amide are dissolved in a water-methanol mixture and 10 mL dichloromethane are added. After stirring for 20 hours at room temperature, the organic phase is separated and concentrated on the rotary evaporator. The liquid product (melting point 21° C.) is obtained in 100% yield.

Thermic stabilty: decomposition onset: 262° C., inflection point: 440° C.

$^1$H-NMR (300 MHz, d$^6$-DMSO, ppm): 8.98 (1H, m, NCHN), 7.52 (1H, m, NCHC), 7.43 (3H, m, NCHC arom, CH), 6.96 (2H, d, J=9.06 Hz, arom. CH), 4.22 (2H, t, J=7.6 Hz, N—CH$_2$), 3.78 (3H, s, Ar—OCH$_3$), 1.86 (2H, m, CH$_2$), 1.22 (16H, m, 8xCH$_2$), 0.79 (3H, m, CH$_3$)

$^{13}$C-NMR (75.5 MHz, d$^6$-DMSO, ppm): 161.0 (C), 133.8 (NCHN), 127.2 (C), 123.6 (CH), 122.9 (CH), 121.8 (CH), 115.5 (CH), 55.7 (CH$_3$), 50.5 (CH$_2$), CH$_2$ 31.8, 30.1, 29.5, 29.4, 29.3, 29.2, 28.8, 26.1, 22.6, 14.0 (CH$_3$)

Elementary analysis ($C_{23}H_{33}F_6N_3O_5S_2$)
calcd.: C, 45.31%, H, 5.46%, N, 6.89%, S, 10.52%.
found: C, 45.62%, H, 5.37%, N, 7.03%, S, 9.58%.

1-(4-Methoxyphenyl)-3-tetradecyl-1H-imidazolium-bis(trifluoromethyl)sulfonylimide ($C_{26}H_{39}F_6N_3O_5S_2$, 651.725 g/mol)

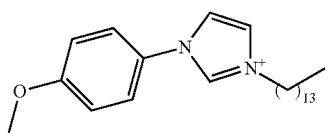

-continued

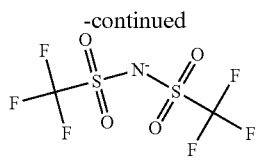

4.061 g (8.99 mmol) 1-(4-methoxyphenyl)-3-tetradecyl-1H-imidazolium-bromide and 2.58 g lithium bis(trifluoromethylsulfonyl)amide are dissolved in a water-methanol mixture and 10 mL dichloromethane are added. After stirring for 20 hours at room temperature, the organic phase is separated and concentrated on the rotary evaporator.

The liquid product is obtained in 92% yield (5.41 g).

$^1$H-NMR (300 MHz, d$^6$-DMSO, ppm): 9.69 (1H, s, NCHN), 8.24 (1H, s, NCHC), 8.01 (1H, s, NCHC), 7.70 (2H, d, J=8.9 Hz, Ar—H), 7.20 (2H, d, J=8.9 Hz, Ar—H), 4.22 (2H, t, J=7.4 Hz, N—CH$_2$), 3.85 (3H, s, Ar—OCH$_3$), 1.88 (2H, m, CH$_2$), 1.27 (22H, m, 11xCH$_2$), 0.85 (3H, m, CH$_3$)

$^{13}$C-NMR (75.5 MHz, d$^6$-DMSO, ppm): 159.9 (C), 135.0 (NCHN), 127.9 (C), 123.4 (2CH), 123.1 (CH), 121.4 (CH), 115.1 (2CH), 55.7 (Ar—OCH$_3$), 49.3 (N—CH$_2$), 31.3 29.1 28.9 28.8 28.7 28.4 25.5 22.1 (CH$_2$), 13.9 (CH$_3$)

Elementary analysis (C$_{26}$H$_{39}$F$_6$N$_3$O$_5$S$_2$)
calcd.: C, 47.92%, H, 6.03%, N, 6.45%, S, 9.84%.
found: C, 48.20%, H, 6.38%, N, 6.64%, S, 8.86%.

1-(2-Methoxyphenyl)-3-hexyl-1H-imidazoliumbis(trifluoromethyl)sulfonylimide (C$_{18}$H$_{23}$F$_6$N$_3$O$_5$S$_2$, 539.513 g/mol)

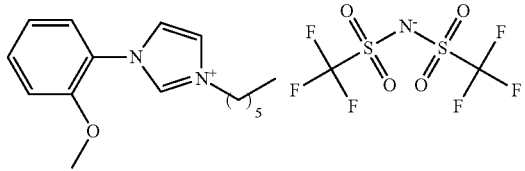

1.34 g (3.5 mmol) 1-(2-methoxyphenyl)-3-hexyl-1H-imidazoliumiodide and 1.2 g (4.2 mmol) lithium bis(trifluoromethylsulfonyl)amide are dissolved in a mixture of 80 mL of water and 20 mL of methanol and 25 mL of dichloromethane are added. After staring for 24 hours at room temperature, the organic phase is separated and concentrated on the rotary evaporator. The liquid product is obtained in 96% yield (1.8 g).

Thermic stability: decomposition onset: 280° C., inflection point: 440° C.

$^1$H-NMR (300 MHz, CDCl$_3$, ppm): 8.84 (1H, s, NCHN), 7.45 (2H, m, NCHC), 7.42 (1H, m, CH arom.), 7.36 (1H, m, CH arom.), 7.04 (2H, m, CH arom.), 4.22 (2H, t, J=7.6 Hz, N—CH$_2$), 3.82 (3H, s, O—CH$_3$), 1.85 (2H, m, CH$_2$), 1.25 (6H, m, 3xCH$_2$), 0.80 (3H, t, J=6.9 Hz, CH$_3$)

$^{13}$C-NMR (75.5 MHz, CDCl$_3$, ppm): 151.9 (C arom), 135.9 (NCHN), 131.9 (CH), 123.3 (CH), 123.6 (CH), 122.9 (C arom.), 121.9 (CH), 121.5 (CH), 113.4 (CH), 56.1 (O—CH$_3$), 50.4 (CH$_2$), 30.9 (CH$_2$), 29.9 (CH$_2$), 25.6 (CH$_2$), 22.3 (CH$_2$), 13.7 (CH$_3$)

Elementary analysis (C$_{18}$H$_{23}$F$_6$N$_3$O$_5$S$_2$)
calcd.: C, 40.07%, H, 4.30%, N, 7.79%, S, 11.89%.
found: C, 40.11%, H, 4.13%, N, 7.93%, S, 11.92%.

1-(2-Methoxyphenyl)-3-undecyl-1H-imidazoliumbis(trifluoromethyl)sulfonylimide (C$_{23}$H$_{33}$F$_6$N$_3$O$_5$S$_2$, 609.646 g/mol)

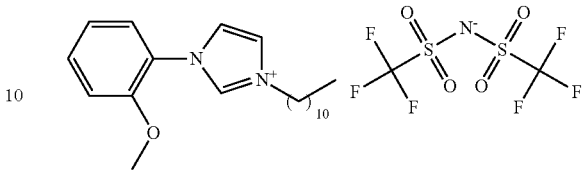

0.94 g (2.6 mmol) 1-(2-methoxyphenyl)-3-undecyl-1H-imidazoliumiodide and 0.88 g (3.1 mmol) lithium bis(trifluoromethylsulfonyl)amide are dissolved in a mixture of 40 mL of water and 10 mL of methanol and 10 mL of dichloromethane added. After stirring for 24 hours at room temperature, the organic phase is separated and concentrated on the rotary evaporator. The liquid product (melting point 28° C.) is obtained in 84% yield (1.06 g).

Thermic stabilty: decomposition onset: 190° C., inflection point: 430° C.

$^1$H-NMR (300 MHz, d$^6$-DMSO, ppm): 9.59 (1H, s, NCHN), 8.08 (1H, s, NCHC), 8.01 (1H, s, NCHC), 7.62 (2H, m, CH arom.), 7.40 (1H, m, CH arom.), 7.20 (1H, m, CH arom.), 4.27 (2H, t, J=7.2 Hz, N—CH$_2$), 3.89 (3H, s, OCH$_3$), 1.89 (2H, m, CH$_2$), 1.29 (16H, m, 8xCH$_2$), 0.86 (3H, m, CH$_3$)

$^{13}$C-NMR (75.5 MHz, d$^6$-DMSO, ppm): 152.2 (C), 137.1 (NCHN), 131.6 (CH), 126.2 (CH), 123.8 (CH), 123.4 (C), 122.2 (CH), 121.6 (CH), 113.2 (CH), 56.3 (OCH$_3$), 49.2 (N—CH$_2$), CH$_2$: 31.3, 29.2, 28.9, 28.8, 28.7, 28.3, 25.5, 22.1, 13.9 (CH$_3$)

Elementary analysis (C$_{23}$H$_{33}$F$_6$N$_3$O$_5$S$_2$)
calcd.: C, 45.31%, H, 5.46%, N, 6.89%, S, 10.52%.
found: C, 45.34%, H, 5.58%, N, 7.24%, S, 10.35%.

1-(2-Methoxyphenyl)-3-tetradecyl-1H-imidazolium-bis(trifluoromethyl)sulfonylimide (C$_{26}$H$_{39}$F$_6$N$_3$O$_5$S$_2$, 651.725 g/mol)

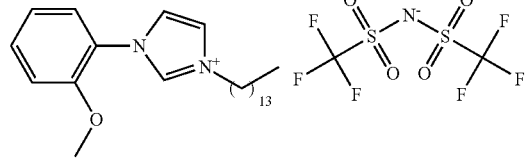

2.25 g (5 mmol) 1-(2-methoxyphenyl)-3-tetradecyl-1H-imidazoliumiodide and 1.72 g (6 mmol) lithium bis(trifluoromethylsulfonyl)amide are dissolved in a mixture of 30 mL of water and 30 mL of methanol and 10 mL of dichloromethane are added. After stirring for 24 hours at room temperature, the organic phase is separated and concentrated on the rotary evaporator. The liquid product is obtained in 94% yield (3.08 g).

$^1$H-NMR (300 MHz, CDCl$_3$, ppm): 8.85 (1H, s, NCHN), 7.54 (3H, m, CH arom., NCHC), 7.38 (1H, m, CH arom.), 7.03 (1H, m, CH arom.), 4.22 (2H, t, J=7.6 Hz, N—CH$_2$), 3.82 (3H, s, OCH$_3$), 1.85 (2H, m, CH$_2$), 1.20 (22H, m, CH$_2$), 0.79 (3H, t, J=6.8 Hz, CH$_3$), $^{13}$C-NMR (75.5 MHz, CDCl$_3$, ppm): 152.0 (C), 135.9 (NCHN), 131.9 (CH), 125.3 (CH), 123.6 (CH), 122.9 (C), 121.9 (CH), 121.5 (CH), 112.6 (CH), 56.1 (CH3), 50.4

(CH₂), 31.8 (CH₂), 30.0 (CH₂), 29.6 (CH₂), 29.5 (CH₂), 29.4 (CH₂), 29.3 (CH₂), 28.8 (CH₂), 28.7 (CH₂), 28.1 (CH₂), 26.0 (CH₂), 22.6 (CH₂), 14.0 (CH₃)

Elementary analysis ($C_{26}H_{39}F_6N_3O_5S_2$)

calcd.: C, 47.92%, H, 6.03%, N, 6.45%, S, 9.84%.

found: C, 48.14%, H, 5.84%, N, 6.55%, S, 8.96%.

1-(4-Ethoxyphenyl)-3-propyl-1H-imidazoliumbis(trifluoromethyl)sulfonylimide ($C_{16}H_{19}F_6N_3O_5S_2$, 511.459 g/mol)

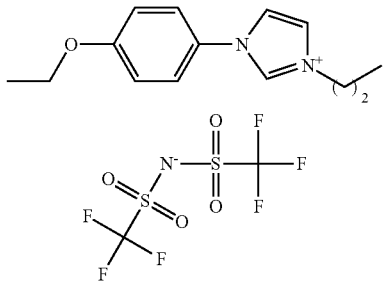

7.91 g (0.025 mol) 1-(4-ethoxyphenyl)-3-propyl-1H-imidazoliumbromide and 7.29 g lithium bis(trifluoromethylsulfonyl)amide are dissolved in 100 mL of water and 25 mL of dichloromethane are added. After stirring for 20 hours at room temperature, the organic phase is separated and concentrated on the rotary operator. The liquid product (the melting point 20° C.) is obtained in 98% yield (12.77 g).

Thermic stabilty: decomposition onset: 320° C., inflection point: 450° C.

¹H-NMR (300 MHz, d⁶-DMSO, ppm): 9.71 (1H, s, NCHN), 8.24 (1H, m, NCHC), 8.01 (1H, m, NCHC), 7.69 (2H, d, J=9 Hz, Ar—H), 7.19 (2H, d, J=9 Hz, Ar—H), 4.21 (2H, t, J=7.4 Hz, N—CH₂), 4.13 (2H, q, J=6.8 Hz, O—CH₂), 1.92 (2H, m, CH₂), 1.37 (3H, t, J=6.9 Hz, CH₃), 0.94 (3H, t, J=7.4, CH₃)

¹³C-NMR (75.5 MHz, d⁶-DMSO): 159.3 (C), 135.1 (NCHN), 127.7 (C), 123.5 (2CH), 123.1 (C), 121.6 (C), 115.5 (2CH), 63.7 (CH₂), 50.8 (CH₂), 22.7 (CH₂), 14.4 (CH₃), 10.4 (CH₃)

Elementary analysis ($C_{16}H_{19}F_6N_3O_5S_2$)

calcd.: C, 37.57%, H, 3.74%, N, 8.22%, S, 12.54%.

found: C, 37.46%, H, 3.81%, N, 8.41%, S, 12.72%.

1-(4-Ethoxyphenyl)-3-butyl-1H-imidazoliumbis(trifluoromethyl)sulfonylimide ($C_{17}H_{21}F_6N_3O_5S_2$, 525.486 g/mol)

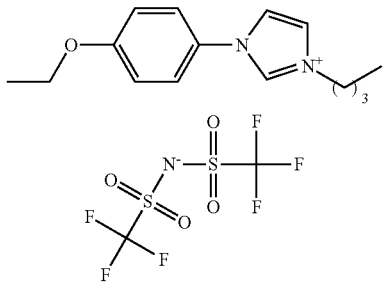

10.07 g (0.031 mol) 1-(4-ethoxyphenyl)-3-butyl-1H-imidazoliumbromide and 8.89 g lithium bis(trifluoromethylsulfonyl)amide are dissolved in 160 mL of water and 25 mL of dichloromethane are added. After stirring for 3 hours at room temperature, the organic phase is separated and concentrated on the rotary evaporator. The liquid product (melting point 6° C.) is obtained in 100% yield (16.08 g).

Thermic stabilty: decomposition onset: 311° C., inflection point: 450° C.

¹H-NMR (300 MHz, d⁶-DMSO, ppm): 9.71 (1H, s, NCHN), 8.23 (1H, s, NCHC), 8.01 (1H, s, NCHC), 7.69 (2H, d, J=9 Hz, CH arom.), 7.18 (2H, d, J=9 Hz, CH arom.), 4.25 (2H, t, J=7.2, N—CH₂), 4.13 (2H, t, J=7 Hz, O—CH₂), 1.89 (2H, m, CH₂), 1.37 (5H, m, CH₃+CH₂), 0.95 (3H, t, J=7.4)

¹³C-NMR (75.5 MHz, d⁶-DMSO, ppm): 159.3 (C), 135.0 (NCHN), 123.5 (2CH), 123.1 (CH), 121.6 (CH), 115.5 (2CH), 63.7 (CH₂), 49.1 (CH₂), 31.2 (CH₂), 18.9 (CH₂), 14.4 (CH₃), 13.2 (CH₃)

Elementary analysis ($C_{17}H_{21}F_6N_3O_5S_2$)

calcd.: C, 38.86%, H, 4.03%, N, 8.00% S, 12.20%.

found: C, 38.72%, H, 3.99%, N, 8.19%, S, 12.43%.

1-(4-Ethoxyphenyl)-3-pentyl-1H-imidazoliumbis(trifluoromethyl)sulfonylimide ($C_{18}H_{23}F_6N_3O_5S_2$, 539.513 g/mol)

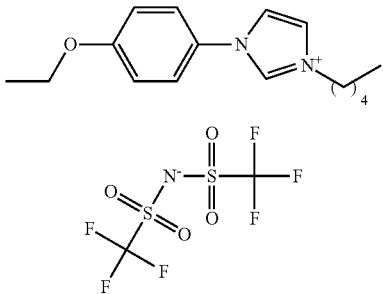

10.29 g (0.03 mol) 1-(4-ethoxyphenyl)-3-pentyl-1H-imidazoliumbromide and 8.71 g lithium bis(trifluoromethylsulfonyl)amide are dissolved in 160 mL of water and 25 mL of dichloromethane are added. After stirring for 1 hour at room temperature, the organic phase is separated and concentrated on the rotary evaporator. The liquid product (glass transition temperature −58° C.) is obtained in 100% yield (16.63 g).

Thermic stabilty: decompositin onset: 307° C., inflection point: 440° C.

¹H-NMR (300 MHz, d⁶-DMSO, ppm): 9.71 (1H, s, NCHN), 8.24 (1H, s, NCHC), 8.01 (1H, s, NCHC), 7.69 (2H, d, J=9 Hz, Ar—H), 7.19 (2H, d, J=8.9 Hz Ar—H), 4.23 (2H, t, J=7.4 Hz, N—H₂), 4.12 (2H, q, J=6.9 Hz, O—CH₂), 1.91 (2H, m, CH₂), 1.35 (7H, m, CH₃+2xCH₂), 0.91 (3H, t, J=7 Hz, CH₃)

¹³C-NMR (75.5 MHz, d⁶-DMSO, ppm): 159.3 (C), 135.0 (NCHN), 127.7 (C), 123.5 (2CH), 123.1 (CH), 121.6 (CH), 115.5 (2CH), 63.7 (CH₂), 49.3 (CH₂), 28.9 (CH₂), 27.7 (CH₂), 21.5 (CH₂), 14.4 (CH₃), 13.6 (CH₃)

Elementary analysis ($C_{18}H_{23}F_6N_3O_5S_2$)

calcd.: C, 40.07%, H, 4.30%, N, 7.79%, S, 11.89%.

found: C, 39.75%, H, 4.03%, N, 7.77%, S, 12.14%.

1-(4-Ethoxyphenyl)-3-hexyl-1H-imidazoliumbis(trifluoromethyl)sulfonylimide ($C_{19}H_{25}F_6N_3O_5S_2$, 553.539 g/mol)

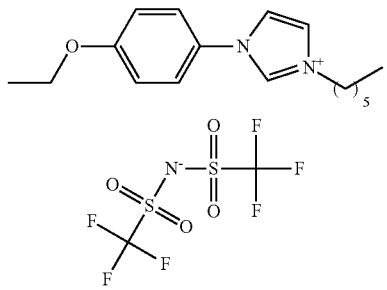

11.85 g (0.034 mol) 1-(4-ethoxyphenyl)-3-hexyl-1H-imidazoliumbromide and 9.63 g lithium bis(trifluoromethylsulfonyl)amide are dissolved in 160 mL of water and 25 mL of dichloromethane are added. After stirring for 20 hours at room temperature, the organic phase is separated and concentrated on the rotary evaporator. The liquid product (melting point 27° C.) is obtained in 99% yield (18.45 g).

Thermic stabilty: decomposition onset: 321° C., inflection point: 440° C.

$^1$H-NMR (300 MHz, d$^6$-DMSO, ppm): 9.71 (1H, s, NCHN), 8.23 (1H, s, NCHC), 8.01 (1H, s, NCHC), 7.69 (2H, d, J=9 Hz, Ar—H), 7.19 (2H, d, J=9 Hz, Ar—H), 4.23 (2H, t, J=7.4 Hz, N—CH$_2$), 4.12 (2H, q, J=7 Hz, O—CH$_2$), 1.89 (2H, m, CH$_2$), 1.37 (3H, t, J=7 Hz), 1.32 (6H, m, 3xCH$_2$), 0.88 (3H, m, CH$_3$), $^{13}$C-NMR (75.5 MHz, d$^6$-DMSO, ppm): 159.3 (C), 135.0 (NCHN), 127.7 (C), 123.5 (2CH), 123.1 (CH), 121.6 (CH), 115.5 (2CH), 63.7 (O—CH$_2$), 49.3 (N—CH$_2$) 30.6 (CH$_2$), 29.1 (CH$_2$), 25.2 (CH$_2$), 21.8 (CH$_2$), 21.8 (CH$_2$), 14.4 (CH$_3$), 13.7 (CH$_3$)

Elementary analysis ($C_{19}H_{25}F_6N_3O_5S2$)

calcd.: C, 41.23%, H, 4.55%, N, 7.59%, S, 11.59%.

found: C, 41.25%, H, 4.62%, N, 7.82%, S, 11.68%.

1-(4-Ethoxyphenyl)-3-undecyl-1H-imidazoliumbis(trifluorometyl)sulfonylimide ($C_{24}H_{35}F_6N_3O_5S_2$, 623.672 g/mol)

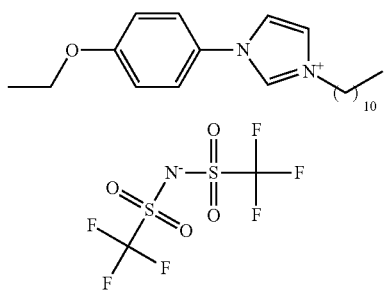

5.71 g (0.012 mol) 1-(4-ethoxyphenyl)-3-undecyl-1H-imidazoliumiodide and 4.18 g lithium bis(trifluoromethylsulfonyl)amide are dissolved in 80 mL of water and 15 mL of dichloromethane are added. After stirring for 20 hours at room temperature, the organic phase is separated and concentrated on the rotary evaporator. The liquid product is obtained in 100% yield.

$^1$H-NMR (300 MHz, CDCl$_3$, ppm): 8.91 (1H, s, NCHN), 7.49 (1H, m, NCHC), 7.42 (1H, m, NCHC), 7.40 (2H, d, J=9.1 Hz, CH arom.), 6.95 (2H, d, J=9.1 Hz, CH arom.), 4.21 (2H, t, J=7.7 Hz, N—CH$_2$), 4.00 (2H, q, J=6.9 Hz, O—CH$_3$), 1.85 (2H, m, CH$_2$), 1.37 (3H, t, J=6.9 Hz, CH$_3$), 1.22 (16H, m, 8xCH$_2$), 0.79 (3H, t, J=6.9 Hz, CH$_3$), $^{13}$C-NMR (75.5 MHz, CDCl$_3$, ppm): 160.5 (C—O), 133.8 (NCHN), 126.2 (C—N), 123.6 (2CH), 122.9 (CH), 121.9 (CH), 115.9 (CH), 64.1 O—CH$_2$) 50.6 (N—CH$_2$), (CH$_2$: 31.8, 30.1, 29.5, 29.4, 29.3, 29.2, 28.9, 26.1, 22.6), 14.6 (CH$_3$), 14.1 (CH$_3$)

Thermic stabilty: decomposition onset: 295° C., inflection point: 440° C.

Elementary analysis ($C_{24}H_{35}F_6N_3O_5S_2$)

calcd.: C, 46.22%, H, 5.66%, N, 6.74%, S, 10.28%.

found: C, 46.15%, H, 4.78%, N, 6.91%, S, 9.99%.

1-(4-Ethoxyphenyl)-3-tetradecyl-1H-imidazoliumbis(trifluoromethyl)sulfonylimide ($C_{27}H_{41}F_6N_3O_5S_2$, 665.752 g/mol)

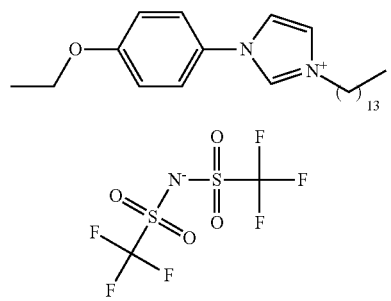

1.923 g (4.13 mmol) 1-(4-ethoxyphenyl)-3-tetradecyl-1H-imidazolium-bromide and 1.19 g lithium bis(trifluoromethylsulfonyl)amide are dissolved in 50 mL of water and 10 mL of dichloromethane. After stirring for 20 hours at room temperature, the organic phase is separated and concentrated on the rotary evaporator the liquid product (melting point 34° C.) is obtained in 89% yield (2.45 g).

$^1$H-NMR (300 MHz, d$^6$-DMSO, ppm): 9.72 (1H, s, NCHN), 8.24 (1H, s, NCHC), 8.01 (1H, s, NCHC), 7.70 (2H, d, J=9 Hz, Ar—H), 7.18 (2H, d, J=9 Hz, Ar—H), 4.24 (2H, t, J=7.4 Hz, N—CH$_2$), 4.12 (2H, q, J=7 Hz, O—CH$_2$), 1.90 (2H, m, CH$_2$), 1.37 (3H, t, J=7 Hz, CH$_3$), 1.30 (24H, m, 12xCH$_2$), 0.86 (3H, m, CH$_3$)

$^{13}$C-NMR (75.5 MHz, d$^6$-DMSO, ppm): 159.3 (C), 134.9 (NCHN), 127.7 (C), 123.4 (2CH), 123.1 (CH), 121.6 (CH), 115.5 (2CH), 63.7 O—CH$_2$), 49.3 (N—CH$_2$), 31.3 (CH$_2$), 29.2 (CH$_2$), 29.1 (CH$_2$), 29.0 (CH$_2$), 28.9 (CH$_2$), 28.8 (CH$_2$), 28.7 (CH$_2$), 28.4 (CH$_2$), 25.6 (CH$_2$), 22.1 (CH$_2$), 14.4 (CH$_3$), 13.8 (CH$_3$)

Elementary analysis ($C_{27}H_{41}F_6N_3O_5S_2$)

calcd.: C, 48.71%, H, 6.21%, N, 6.31%, S, 9.63%.

found: C, 48.86%, H, 6.38%, N, 6.49%, S, 9.82%.

1-(2-Ethoxyphenyl)-3-butyl-1H-imidazoliumbis(trifluoromethyl)sulfonylamide ($C_{17}H_{21}F_6N_3O_5S_2$, 525.486 g/mol)

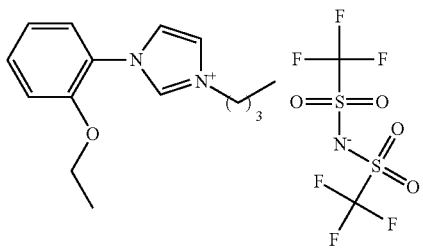

5.73 g (15.4 mmol) 1-(2-ethoxyphenyl)-3-butylimidazoliumiodide and 5.31 g (18.5 mmol) lithium bis(trifluoromethylsulfonyl)amide are dissolved in 100 mL of a methanol-water mixture and 25 mL of methane are added. After stirring for 24 hours at room temperature, the organic phase is separated and concentrated on the rotary evaporator. The liquid product is obtained in 100% yield (8.16 g).

Thermic stabilty: decomposition onset: 270° C., inflection point: 401° C.

$^1$H-NMR (300 MHz, CDCl$_3$, ppm): 8.82 (1H, s, NCHN), 7.47 (1H, m, NCHC), 7.45 (1H, m, NCHC), 7.36 (2H, m, CH arom.), 7.01 (2H, m, CH arom.), 4.23 (2H, t, J=7.4 Hz, N—CH$_2$), 4.06 (2H, q, J=6.9 Hz, O—CH$_2$), 1.84 (2H, m, CH$_2$), 1.32 (2H, m, CH$_2$), 1.29 (3H, t, J=6.9 Hz, CH$_3$), 0.89 (3H, t, J=7.4 Hz, CH$_3$)

$^{13}$C-NMR (75.5 MHz, CDCl$_3$, ppm): 151.33 (C arom.), 135.8 (NCHN), 131.9 (CH), 125.3 (CH), 123.6 (CH), 122.9 (CH), 122.0 (CH), 121.3 (CH), 113.3 (CH), 64.8 (CH$_2$), 50.1 (CH$_2$), 31.9 (CH$_2$), 19.2 (CH$_2$), 14.2 (CH$_3$), 13.1 (CH$_3$)

Elementary analysis ($C_{17}H_{21}F_6N_3O_5S_2$)
calcd: C, 38.86%, H, 4.03%, N, 7.89%, S, 12.20%.
found: C, 38.15%, H, 4.35%, N, 7.92%, S, 11.65%.

1-(2-Ethoxyphenyl)-3-hexyl-1H-imidazoliumbis(trifluoromethyl)sulfonylamide ($C_{19}H_{25}F_6N_3O_5S_2$, 553.539 g/mol)

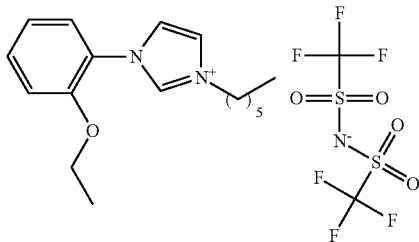

5.13 g (12.8 mmol) 1-(2-Ethoxyphenyl)-3-hexylimidazoliumiodide and 4.41 g (15.4 mmol) lithium bis(trifluoromethylsulfonyl)amide are dissolved in 100 mL of a methanol-water mixture and 25 mL of dichloromethane are added. After stirring for 24 hours at room temperature, the organic phase is separated and concentrated on the rotary evaporator. The liquid product is obtained in 86% yield (6.11 g).

Thermic stabilty: decomposition onset: 331° C., inflection point: 439° C.

$^1$H-NMR (300 MHz, CDCl$_3$, ppm): 8.84 (1H, s, NCHN), 7.46 (2H, m, CH arom.), 7.37 (2H, m, CH arom.), 7.04 (1H, s, NCHC), 7.01 (1H, s, NCHC), 4.23 (2H, t, J=7.4 Hz, N—CH$_2$), 4.07 (2H, q, J=6.9 Hz, O—CH$_2$), 1.85 (2H, m, CH$_2$), 1.30 (3H, t, J=6.9 Hz, CH$_3$), 1.25 (6H, m, 3xCH$_2$), 0.80 (3H, t, J=7.0 Hz, CH$_3$)

$^{13}$C-NMR (75.5 MHz, CDCl$_3$, ppm): 151.3 (C), 135.8 (NCHN), 131.9 (CH), 125.3 (CH), 123.6, 122.9 (C), 121.9 (CH), 121.3 (CH), 113.3 (CH), 64.8 (CH$_2$), 50.4 (CH$_2$), 30.9 (CH$_2$), 29.9 (CH$_2$), 25.6 (CH$_2$), 22.2 (CH$_2$), 14.2 (CH$_3$), 13.8 (CH$_3$)

Elementary analysis ($C_{19}H_{25}F_6N_3O_5S_2$)
calcd.: C, 41.23%, H, 4.55%, N, 7.59%, S, 11.59%.
found: C, 41.35%, H, 4.48%, N, 7.77%, S, 10.56%.

1-(2-Ethoxyphenyl)-3-undecyl-1H-imidazoliumbis(trifluoromethyl)sulfonylamide ($C_{24}H_{35}F_6N_3O_5S_2$, 623.672 g/mol)

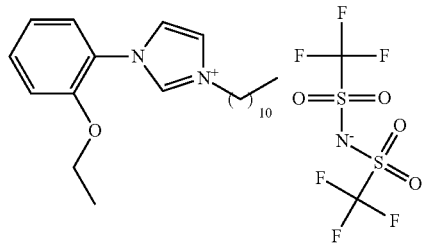

4.9 g (10.4 mmol) 1-(2-ethoxyphenyl)-3-undecylimidazoliumiodide and 3.58 g (12.5 mmol) lithium bis(trifluoromethylsulfonyl)amide are dissolved in 100 mL of a methanol-water mixture and 25 mL of dichloromethane are added. After stirring for 24 hours at room temperature, the organic phase is separated and concentrated on the rotary evaporator and the liquid product is obtained in 97% yield (6.29 g).

Thermic stabilty: decompositin onset: 240° C., inflection point: 425° C.

$^1$H-NMR (300 MHz, CDCl$_3$, ppm): 8.86 (1H, s, NCHN), 7.46 (2H, s, NCHC), 7.37 (2H, m, CH arom.), 7.01 (2H, m, CH arom.), 4.23 (2H, t, J=7.4 Hz, N—CH$_2$), 4.07 (2H, q, J=6.8 Hz, O—CH$_2$), 1.85 (2H, m, CH$_2$), 1.30 (3H, t, J=6.9 Hz, CH$_3$), 1.20 (16H, m, 8xCH$_2$), 0.79 (3H, t, J=7.0 Hz, CH$_3$)

$^{13}$C-NMR (75.5 MHz, CDCl$_3$, ppm): 151.3 (C arom.), 135.8 (NCHN), 131.9 (CH), 125.3 (CH), 123.6 (CH), 122.9 (C arom.), 121.9 (CH), 121.3 (CH), 113.4 (CH), 50.4 (CH$_2$), 3.18 (CH$_2$), 30.0 (CH$_2$), 29.5 (CH$_2$), 29.4 (CH$_2$), 29.2 (CH$_2$), 29.2 (CH$_2$), 29.1 (CH$_2$), 28.8 (CH$_2$), 25.9 (CH$_2$), 22.6 (CH$_2$), 14.2 (CH$_3$), 14.0 (CH$_3$)

elementary analysis ($C_{24}H_{35}F_6N_3O_5S_2$)
calcd: C, 46.22%, H, 5.66%, N, 6.74%, S, 10.28%.
found: C, 46.26%, H, 5.50%, N, 6.90%, S, 10.24%.

1-(2-Ethoxyphenyl)-3-tetradecyl-1H-imidazoliumbis(trifluoromethyl)sulfonylamide ($C_{27}H_{41}F_6N_3O_5S_2$, 665.752 g/mol)

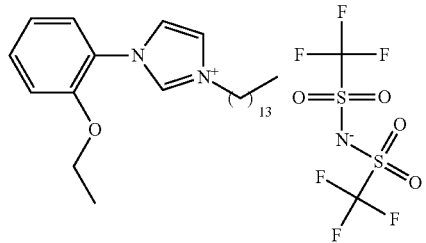

2.65 g (5.7 mmol) 1-(2-ethoxyphenyl)-3-tetradecylimidazoliumbromide and 1.96 g (6.8 mmol) lithium bis(trifluoromethylsulfonyl)amide are dissolved in 100 mL of a methanol-water mixture and 25 mL of dichloromethane are added. After stirring for 24 hours at room temperature, the organic phase is separated and concentrated on the rotary evaporator. The liquid product is obtained in 78% yield (2.97 g).

$^1$H-NMR (300 MHz, CDCl$_3$, ppm): 8.83 (1H, s, NCHN), 7.45 (2H, m, NCHC), 7.37 (2H, m, CH arom.), 7.01 (2H, m, CH arom.), 4.23 (2H, t, J=7.6 Hz, N—CH$_2$), 4.07 (2H, q, J=6.9 Hz, O—CH$_2$), 1.85 (2H, m, CH$_2$), 1.30 (3H, t, J=6.9 Hz, CH$_3$), 1.20 (22H, m, 11xCH$_2$), 0.79 (3H, t, J=6.8 Hz, CH$_3$)

$^{13}$C-NMR (75.5 MHz, CDCl$_3$, ppm): 151.3 (C arom.), 135.8 (NCHN), 131.9 (CH), 125.3 (CH), 123.6 (CH), 121.9 (CH), 121.3 (CH), 113.4 (CH), 64.8 (CH$_2$), 50.4 (CH$_2$), 31.8 (CH$_2$), 30.0 (CH$_2$), 29.6 (CH$_2$), 29.5 (CH$_2$), 29.4 (CH$_2$), 29.3 (CH$_2$), 28.9 (CH$_2$), 25.9 (CH$_2$), 22.6 (CH$_2$), 14.2 (CH$_2$), 14.0 (CH$_2$), Elementary analysis (C$_{27}$H$_{41}$F$_6$N$_3$O$_5$S$_2$)
calcd.: C, 48.71%, H, 6.21%, N, 6.31%, S, 9.63%.
found: C, 48.70%, H, 6.63%, N, 6.62%, S, 8.75%.

1-(4-Bromophenyl)-3-butyl-1H-imidazoliumbis(trifluoromethyl)sulfonylamide (C$_{15}$H$_{16}$BrF$_6$N$_3$O$_4$S$_2$, 560.329 g/mol)

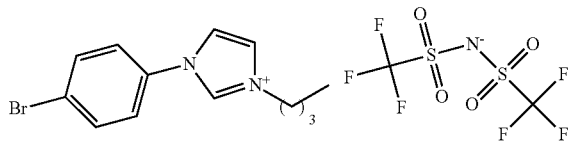

4.42 g (0.011 mol) 1-(4-bromophenyl)-3-butylimidazoliumiodide and 3.74 g lithium bis(trifluoromethylsulfonyl)amide are dissolved in a water-methanol mixture and 10 mL of dichloromethane are added. The reaction mixture is stirred for 24 hours at room temperature and the organic phase is separated subsequently. After removal of the solvent, the liquid product is obtained in 100% yield (6.012 g).

Thermic stabilty: Decomposition onset: 324° C., inflection point: 450° C.

$^1$H-NMR (300 MHz, d$^6$-DMSO, ppm): 9.83 (1H, s, NCHN), 8.33 (1H, s, NCHC), 8.05 (1H, s, NCHC), 7.90 (2H, d, J=8.6 Hz, CH arom.), 4.25 (2H, t, J=7.4, N—CH$_2$), 1.88 (2H, m, CH$_2$), 1.34 (2H, m, CH$_2$), 0.94 (3H, t, J=7.4 Hz, CH$_3$)

$^{13}$C-NMR (75.5 MHz, d$^6$-DMSO, ppm): 135.5 (NCHN), 134.1 (C arom.), 132.9 (2CH), 123.4 (2CH), 123.4 (CH), 122.3 (C arom.), 119.3 (CH), 49.3 (CH$_2$), 31.1 (CH$_2$), 18.9 (CH$_2$), 13.2 (CH$_3$)

Elementary analysis (C$_{15}$H$_{16}$BrF$_6$N$_3$O$_4$S$_2$)
calcd.: C, 32.15%, H, 2.88%, N, 7.50%, S, 11.45%.
found: C, 32.3%, H, 2.55%, N, 7.78%, S, 11.27%.

1-(4-Bromophenyl)-3-hexyl-1H-imidazoliumbis(trifluoromethyl)sulfonylamide (C$_{17}$H$_{20}$BrF$_6$N$_3$O$_4$S$_2$, 588.383 g/mol)

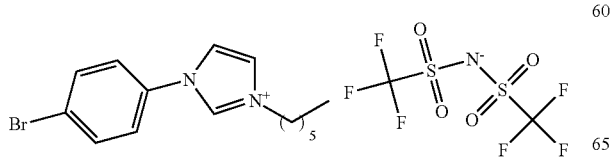

2.966 g (6.8 mmol) 1-(4-bromophenyl)-3-hexyl-1H-imidazoliumiodide and 2.33 g lithium bis(trifluoromethylsulfonyl)amide are dissolved in a water-methanol mixture and 10 mL of dichloromethane are added. The reaction mixture is stirred for 24 hours at room temperature and the organic phase is separated subsequently. After removal of the solvent, the product (melting point 31° C.) is obtained in 100% yield.

Thermic stability: Decomposition onset: 304° C., inflection point: 450° C.

$^1$H-NMR (300 MHz, d$^6$-DMSO, ppm): 9.83 (1H, s, NCHN), 8.33 (1H, m, NCHC), 8.05 (1H, m, NCHC), 7.91 (2H, d, J=9 Hz, Ar—H), 7.77 (2H, d, J=9 Hz, Ar—H), 4.24 (2H, t, J=7 Hz, N—CH$_2$), 1.89 (2H, m, CH$_2$), 1.32 (6H, m, 3xCH$_2$), 0.88 (3H, t, J=6.5 Hz, CH$_3$)

$^{13}$C-NMR (75.5 MHz, d$^6$-DMSO, ppm): 135.5 (NCHN), 134.1 (C), 132.9 (CH), 123.9 (CH), 122.6 (C), 122.2 (CH), 121.1 (CH), 49.4 (N—CH$_2$), 30.6 (CH$_2$), 29.0 (CH$_2$), 25.2 (CH$_2$), 21.8 (CH$_2$), 13.8 (CH$_3$), Elementary analysis (C$_{17}$H$_{20}$BrF$_6$N$_3$O$_4$S$_2$)
calcd.: C, 34.70%, H, 3.43%, N, 7.14%, S, 10.90%.
found: C, 34.77%, H, 3.35%, N, 7.41%, S, 10.15%.

1-(4-Bromophenyl)-3-undecyl-1H-imidazoliumbis(trifluoromethyl)sulfonylamide (C$_{22}$H$_{30}$BrF$_6$N$_3$O$_4$S$_2$, 658.516 g/mol)

4.38 g (9 mmol) 1-(4-bromophenyl)-3-undecyl-1H-imidazoliumiodide and 2.99 g lithium bis(trifluoromethylsulfonyl)amide are dissolved in a water-methanol mixture and dichloromethane is added. The reaction mixture is stirred for 24 hours at room temperature and the organic phase is separated subsequently. After removal of the solvent, the product (melting point 35° C.) is obtained in 94% yield (5.54 g).

Thermic stabilty: Decomposition onset: 243° C., inflection point: 460° C.

$^1$H-NMR (300 MHz, d$^6$-DMSO, ppm): 9.83 (1H, s, NCHN), 8.33 (1H, m, NCHC), 8.05 (1H, m, NCHC), 7.91 (2H, d, J=8.7 Hz, CH arom.), 7.77 (2H, d, J=8.7 Hz, CH arom.), 4.24 (2H, t, J=7.2 Hz, N—CH$_2$), 1.89 (2H, m, CH$_2$), 1.28 (16H, m, 8xCH$_2$), 0.86 (3H, m, CH$_3$)

$^{13}$C-NMR (75.5 MHz, d$^6$-DMSO, ppm): 135.5 (NCHN), 134.1 (C), 132.9 (2CH), 123.9 (2CH), 123.3 (CH), 121.6 (CH), 49.5 (N—CH$_2$), CH$_2$: 31.3, 29.1, 28.9, 28.8, 28.7, 28.4, 25.5, 22.1, 13.9 (CH$_3$)

Elementary analysis (C$_{22}$H$_{30}$BrF$_6$N$_3$O$_4$S$_2$)
calcd.: C, 40.13%, H, 4.59%, N, 6.38%, S, 9.74%.
found: C, 40.04%, H, 4.46%, N, 6.57%, S, 9.55%.

1-(4-Ethylphenyl)-3-methyl-1H-imidazoliumbis(trifluoromethyl)sulfonylamide (C$_{15}$H$_{17}$F$_6$N$_3$O$_4$S$_2$, 467.407 g/mol)

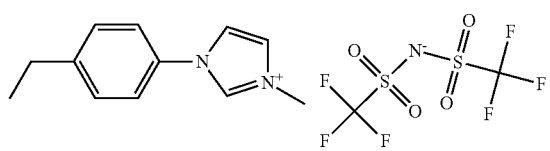

4.0 g (0.013 mmol) 1-(4-ethylphenyl)-3-methylimidazoliumiodide and 3.73 g (0.013 mmol) lithium bis(trifluoromethylsulfonyl)amide are dissolved in 100 mL of water and 50 mL of dichloromethane are added. The reaction mixture is stirred for 2 hours at room temperature and the organic phase is separated subsequently. After removal of the solvent, the liquid product is obtained in 87% yield.

Thermic stabilty: decomposition onset: 330° C., inflection point: 455° C.

$^1$H-NMR (300 MHz, d$^6$-DMSO, ppm): 9.69 (1H, s, NCHN), 8.24 (1H, m, NCHC), 7.92 (1H, m, NCHC), 7.65 (2H, d, J=8.5 Hz, CH arom.), 7.49 (2H, d, J=8.5 Hz, CH arom.), 3.93 (3H, s, N—CH$_3$), 2.69 (2H, q, J=7.5 Hz, Ar—CH$_2$), 1.21 (3H, t, J=7.5 Hz, C—CH$_3$)

$^{13}$C-NMR (75.5 MHz, d$^6$-DMSO, ppm): 145.9 (C arom.), 135.8 (NCHN), 132.6 (C arom.), 129.4 (2CH), 124.4 (CH), 121.8 (2CH), 121.1 (CH), 36.1 (N—CH$_3$), 27.7 (Ar—CH$_2$), 15.3 (CH$_3$)

Elementary analysis (C$_{15}$H$_{17}$F$_6$N$_3$O$_4$S$_2$)
calcd.: C, 35.98%, H, 3.23%, N, 8.99%, S, 13.72%.
found: C, 36.07%, H, 3.14%, N, 9.20%, S, 13.59%.

1-(4-Ethylphenyl)-3-butyl-1H-imidazoliumbis(trifluoromethyl)sulfonylimide (C$_{17}$H$_{21}$F$_6$N$_3$O$_4$S$_2$, 509.487 g/mol)

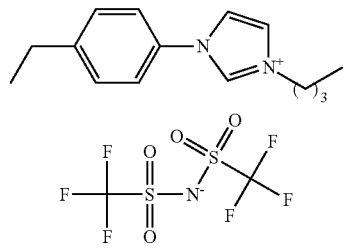

3.15 g (8.84 mmol) 1-(4-ethylphenyl)-3-butyl-1H-limidazoliumiodide and 3.05 g lithium bis(trifluoromethylsulfonyl)amide are dissolved in 50 mL of water and 10 mL of dichloromethane are added. After stirring for 20 hours at room temperature, the organic phase is separated and concentrated on the rotary evaporator. The liquid product is obtained in 100% yield.

Thermic stabilty: decomposition onset: 324° C., inflection point: 450° C.

$^1$H-NMR (300 MHz, d$^6$-DMSO, ppm): 9.78 (1H, s, NCHN), 8.30 (1H, m, NCHC), 8.04 (1H, m, NCHC), 7.70 (2H, d, J=8.5 Hz, CH arom.), 7.51 (2H, d, J=8.5 Hz, CH arom.), 4.26 (2H, t, J=7.4 Hz, N—CH$_2$), 2.72 (2H, q, J=7.6 Hz, Ph—CH$_2$), 1.90 (2H, m, CH$_2$), 1.36 (2H, m, CH$_2$), 1.23 (3H, t, J=7.6 Hz, CH$_3$), 0.95 (3H, t, J=7.4 Hz, CH$_3$)

$^{13}$C-NMR (75.5 MHz, d$^6$-DMSO, ppm): 145.8 (C), 135.1 (NCHN), 132.6 (C), 129.3 (CH), 123.2 (CH), 121.8 (CH), 121.2 (CH), 49.1 (CH$_2$), 31.1 (CH$_2$), 28.7 (CH$_2$), 18.8 (CH$_2$), 15.4 (CH$_3$), 13.2 (CH$_3$)

Elementary analysis (C$_{17}$H$_{21}$F$_6$N$_3$O$_4$S$_2$)
calcd.: C, 40.08%, H, 4.14%, N, 8.25%, S, 12.59%.
found: C, 40.43%, H, 4.37%, N, 8.42%, S, 12.37%.

1-(4-Ethylphenyl)-3-hexyl-1H-imidazoliumbis(trifluoromethyl)sulfonylimide (C$_{19}$H$_{25}$F$_6$N$_3$O$_4$S$_2$, 537.539 g/mol)

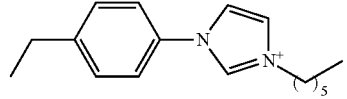

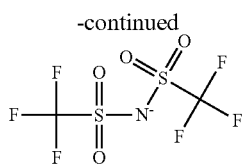

6.38 g (0.017 mol) 1-(4-ethylphenyl)-3-hexyl-1H-imidazoliumiodide and 5.72 g lithium bis(trifluoromethylsulfonyl)amide are dissolved in 80 mL water and 25 mL of dichloromethane are added. After stirring for 20 hours at room temperature, the organic phase is separated and concentrated on the rotary evaporator. The liquid product is obtained in 86% yield (7.9 g).

$^1$H-NMR (300 MHz, CDCl$_3$, ppm): 9.78 (1H, s, NCHN), 8.29 (1H, s, NCHC), 8.04 (1H, s, NCHC), 7.70 (2H, d, J=8.3 Hz, Ar—H), 7.50 (2H, d, J=8.3 Hz, Ar—H), 4.25 (2H, t, J=7.4 Hz, N—CH$_2$), 2.72 (2H, q, J=7.6 Hz, Ar—CH$_2$), 1.91 (2H, m, CH$_2$), 1.33 (6 H, m, 3xCH$_2$), 1.23 (3H, t, J=7.6 Hz, CH$_3$), 0.89 (3H, m, CH$_3$)

$^{13}$C-NMR (75.5 MHz, CDCl$_3$, ppm): 145.8 (C), 135.1 (NCHN), 132.6 (C), 129.3 (2CH), 121.8 (CH), 121.6 (2CH), 121.2 (CH), 117.4 (CF$_3$), 49.4 (N—CH$_2$), 30.6 (CH$_2$), 29.1 (CH$_2$), 27.7 (CH$_2$), 25.2 (CH$_2$), 21.8 (CH$_2$), 15.4 (CH$_3$), 13.7 (CH$_3$)

Elementary analysis (C$_{19}$H$_{25}$F$_6$N$_3$O$_4$S$_2$)
calcd.: C, 42.45%, H, 4.69%, N, 7.82%, S, 11.93%.
found: C, 42.23%, H, 4.79%, N, 7.96%, S, 11.77%.

1-(4-Ethylphenyl)-3-undecyl-1H-imidazoliumbis(trifluoromethyl)sulfonylimide (C$_{24}$H$_{35}$F$_6$N$_3$O$_4$S$_2$, 607.673 g/mol)

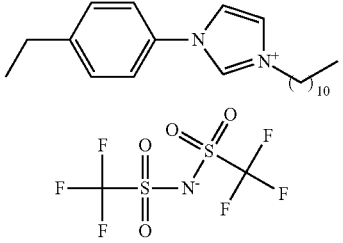

2.27 g (0.005 mol) 1-(4-ethylphenyl)-3-undecyl-1H-limidazoliumiodide and 1.72 g lithium bis(trifluoromethylsulfonyl)amide are dissolved in 50 mL of water and 10 mL of dichloromethane are added. After stirring for 20 hours at room temperature, the organic phase is separated and concentrated on the rotary evaporator. The liquid product is obtained in 100% yield.

Thermic stabilty: decomposition onset: 315° C., inflection point: 440° C.

$^1$H-NMR (300 MHz, CDCl$_3$, ppm): 8.98 (1H, s, NCHN), 7.57 (1H, m, NCHC), 7.48 (1H, m, NCHC), 7.41 (2H, d, J=8.5 Hz, arom. CH), 7.31 (2H, d, J=8.5 Hz, arom. CH), 4.23 (2H, t, J=8.4 Hz, N—CH$_2$), 2.64 (2H, q, J=7.6 Hz, C$_{arom}$-CH$_2$), 1.86 (2H, m, CH$_2$), 1.21 (19H, m, CH$_3$, 8xCH$_2$), 0.79 (3H, m, CH$_3$)

$^{13}$C-NMR (75.5 MHz, CDCl$_3$, ppm): 147.5 (C), 133.7 (NCHN), 131.9 (C), 129.9 (CH), 123.2 (CH), 121.9 (CH), 121.7 (CH), 50.6 (CH$_2$), CH$_2$ 31.8, 30.1, 29.5, 29.4, 29.3, 29.2, 28.8, 28.4, 26.1, 22.6, 15.2 (CH$_3$), 14.0 (CH$_3$)

Elementary analysis (C$_{24}$H$_{35}$F$_6$N$_3$O$_4$S$_2$.0.5H$_2$O)
calcd.: C, 46.74%, H, 5.88%, N, 6.81%, S, 10.38%.
found: C, 46.73%, H, 5.95%, N, 7.27%, S, 9.91%.

1-(4-Ethylphenyl)-3-tetradecyl-1H-imidazoliumbis(trifluoromethyl)sulfonylimide ($C_{27}H_{41}F_6N_3O_4S_2$, 649.753 g/mol)

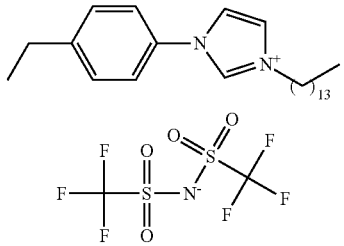

2.25 g (5 mmol) 1-(4-ethylphenyl)-3-tetradecyl-1H-imidazoliumbromide and 1.72 g lithium bis(trifluoromethylsulfonyl)amide are dissolved in 50 mL of water-methanol mixture and 10 mL of dichloromethane are added. After stirring for 20 hours at room temperature, the organic phase is separated and concentrated on the rotary evaporator.

The liquid product is obtained in 100% yield (3.27 g).

$^1$H-NMR (300 MHz, CDCl$_3$, ppm): 8.97 (1H, s, NCHN), 7.57 (1H, m, NCHC), 7.48 (1H, m, NCHC), 7.41 (2H, d, J=8.6 Hz, CH arom.), 7.31 (2H, d, J=8.6 Hz, CH arom.), 4.22 (2H, t, J=7.6 Hz, N—CH$_2$), 2.64 (2H, q, J=7.7 Hz, CH$_2$), 1.86 (2H, m, CH$_2$), 1.21 (22H, m, 11xCH$_2$), 1.18 (3H, t, J=7.7 Hz, CH$_3$), 0.78 (3H, t, J=6.8 Hz, CH$_3$)

$^{13}$C-NMR (75.5 MHz, CDCl$_3$, ppm): 147.3 (C), 133.7 (NCHN), 132.0 (C), 129.9 (CH), 123.2 (CH), 121.9 (CH), 121.7 (CH), 50.6 (CH$_2$), 31.9 (CH$_2$), 30.1 (CH$_2$), 29.6 (CH$_2$), 29.5 (CH$_2$), 29.4 (CH$_2$), 29.3 (CH$_2$), 28.9 (CH$_2$), 28.4 (CH$_2$), 26.1 (CH$_2$), 22.6 (CH$_2$), 15.2 (CH$_3$), 14.0 (CH$_3$)

Elementary analysis ($C_{27}H_{41}F_6N_3O_4S_2$)
calcd.: C, 49.91%, H, 6.36%, N, 6.47%, S, 9.87%.
found: C, 50.03%, H, 6.59%, N, 6.83%, S, 9.49%.

1-(2-Ethylphenyl)-3-methyl-1H-imidazoliumbis(trifluoromethyl)sulfonylamide ($C_{14}H_{15}F_6N_3O_4S_2$, 467.407 g/mol)

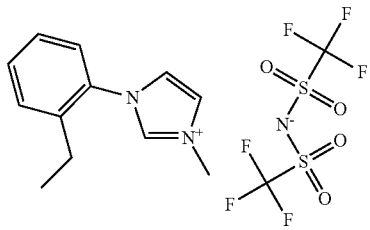

17.5 g (0.056 mmol) 1-(2-ethylphenyl)-3-methylimidazoliumiodide and 16 g (0.056 mmol) lithium bis(trifluoromethylsulfonyl)amide are dissolved in 250 mL of water and 25 mL of dichloromethane are added. The reaction mixture is stirred for 2 hours at room temperature and the organic phase is separated subsequently. After removal of the solvent, an oily liquid is obtained in 97% yield.

Thermic stabilty: decomposition onset: 255° C., inflection point: 460° C.

$^1$H-NMR (300 MHz, d$^6$-DMSO, ppm): 9.45 (1H, s, NCCH), 8.04 (1H, s, NCCH), 7.95 (1H, s, NCCH), 7.6 (2 H, m, CH arom.), 7.5 (3H, m, CH arom.), 2.5 (2H, q, C—CH$_2$), 1.09 (3H, t, CH$_3$)

$^{13}$C-NMR (75.5 MHz, d$^6$-DMSO, ppm): 139.4 (C arom.), 137.8 (NCHN), 133.7 (C arom.), 130.9 (CH), 129.8 (CH), 127.3 (CH), 126.9 (CH), 124.0 (CH), 123.9 (CH), 36.1 (N—CH$_3$), 23.0 (Ar—CH$_2$), 14.4 (CH$_3$)

Elementary analysis ($C_{14}H_{15}F_6N_3O_4S_2$)
calcd.: C, 35.98%, H, 3.23%, N, 8.99%, S, 13.72%.
found: C, 35.72%, H, 3.26%, N, 9.05%, S, 13.69%.

1-(2-Ethylphenyl)-3-butyl-1H-imidazoliumbis(trifluoromethyl)sulfonylimide ($C_{17}H_{21}F_6N_3O_4S_2$, 509.487 g/mol)

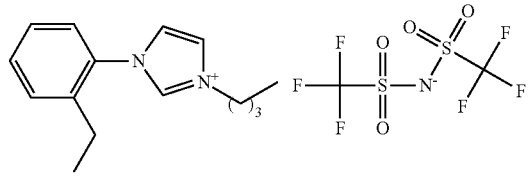

0.68 g (1.91 mmol) 1-(2-ethylphenyl)-3-butyl-1H-imidazoliumiodide and 0.55 g lithium bis(trifluoromethylsulfonyl)amide are dissolved in 50 mL of water and 10 mL of dichloromethane are added. After stirring for 24 hours at room temperature, the organic phase is separated and concentrated on the rotary evaporator. The liquid product (melting point 16° C.) is obtained in 100% yield.

Thermic stabilty: decomposition onset: 295° C., inflection point 440° C.

$^1$H-NMR (300 MHz, d$^6$-DMSO, ppm): 9.57 (1H, s, NCHN), 8.09 (1H, s, NCHC), 8.07 (1H, s, NCHC), 7.56 (4H, m, CH arom.), 4.29 (2H, t, J=7.4 Hz, N—CH$_2$), 2.50 (2H, q, J=7.6 Hz, Ph—CH$_2$), 1.91 (2H, m, CH$_2$), 1.34 (2H, m, CH$_2$), 1.10 (3H, t, J=7.6 Hz, CH$_3$), 0.96 (3H, t, J=7.4 (3H, t, J=7.4 Hz, CH$_3$)

$^{13}$C-NMR (75.5 MHz, d$^6$-DMSO, ppm): 139.3 (C), 137.1 (NCHN), 133.7 (C), 130.9 (CH), 129.8 (CH), 127.3 (CH), 126.9 (CH), 124.3 (CH), 122.8 (CH), 121.6 (CF$_3$), 117.4 (CF$_3$), 49.0 (CH$_2$), 31.1 (CH$_2$), 23.1 (CH$_2$), 18.8 (CH$_2$), 14.3 (CH$_3$), 13.2 (CH$_3$)

Elementary analysis ($C_{17}H_{21}F_6N_3O_4S_2$)
calcd.: C, 40.08%, H, 4.15%, N, 8.25%, S, 12.59%.
found: C, 40.34%, H, 4.36%, N, 8.48%, S, 12.26%.

1-(2-Ethylphenyl)-3-hexyl-1H-imidazoliumbis(trifluoromethyl)sulfonylimide ($C_{19}H_{25}F_6N_3O_4S_2$, 537.539 g/mol)

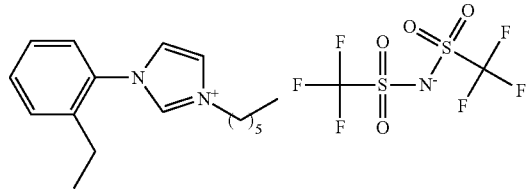

6.38 g (0.017 mol) 1-(2-ethylphenyl)-3-hexyl-1H-imidazoliumiodide and 5.72 g lithium bis(trifluoromethylsulfonyl)amide are dissolved in 100 mL of water and 25 mL of dichloromethane are added after stirring for one hour at room temperature, the organic phase is separated and concentrated on the rotary evaporator. The liquid product is obtained in 86% yield (7.9 g).

¹H-NMR (300 MHz, d⁶-DMSO, ppm): 9.57 (1H, s, NCHN), 8.09 (1H, m, NCHC), 8.07 (1H, m, NCHC), 7.56 (4H, m, CH arom.), 4.29 (2H, d, J=7.2 Hz, N—CH₂), 2.50 (2H, q, J=7.6 Hz, CH₂), 1.92 (2H, m, CH₂), 1.32 (6H, m, 3xCH₂), 1.90 (3H, t, J=7.6 Hz, CH₃), 0.89 (3H, m, CH₃)

¹³C-NMR (75.5 MHz, d⁶-DMSO, ppm): 139.3 (CH), 137.1 (NCHN), 133.7 (C), 131.0 (CH), 129.8 (CH), 127.3 (CH), 126.9 (CH), 124.3 (CH), 122.8 (CH), 121.6 (CF₃), 117.4 (CF₃), 49.3 (N—CH₂), 30.5 (CH₂), 29.0 (CH₂), 25.1 (CH₂), 23.1 (CH₂), 21.9 (CH₂), 14.3 (CH₃), 13.7 (CH₃)

Elementary analysis (C₁₉H₂₅F₆N₃O₄S₂)
calcd.: C, 42.45%, H, 4.69%, N, 7.82%, S, 11.93%.
found: C, 42.67%, H, 4.88%, N, 7.96%, S, 11.84%.

1-(2-Ethylphenyl)-3-undecyl-1H-imidazoliumbis(trifluoromethyl)sulfonylimide (C₂₄H₃₅F₆N₃O₄S₂, 607.673 g/mol)

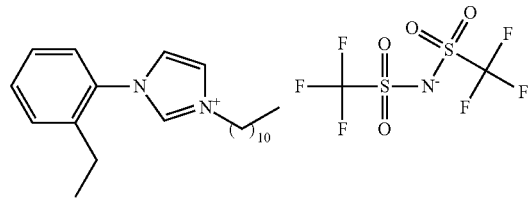

1.095 g (2.41 mmol) 1-(2-ethylphenyl)-3-undecyl-1H-imidazoliumiodide and 0.83 g lithium bis(trifluoromethylsulfonyl)amide are dissolved in 60 mL of water and 10 mL of dichloromethane are added. After stirring for 20 hours at room temperature, the organic phase is separated and concentrated on the rotary evaporator. The liquid product (melting point 22° C.) is obtained in 100% yield.

Thermic stabilty: decomposition onset: 299° C., inflection point: 430° C.

¹H-NMR (300 MHz, CDCl₃, ppm): 8.73 ppm (1H, s, NCHN), 7.53 ppm (1H, s, NCHC), 7.47 ppm (1H, m), 7.36 ppm (1H, m), 7.26 ppm (3H, m), 4.25 ppm (2H, t, J=7.6 Hz, N—CH₂), 2.39 ppm (2H, q, J=7.6 Hz, Ar—CH₂), 1.86 ppm (2H, m, CH₂), 1.22 ppm (16H, m, 8xCH₂), 1.07 ppm (3H, t, J=7.6 Hz, CH₃), 0.80 ppm (3H, m, CH₃)

¹³C-NMR (75.5 MHz, CDCl₃, ppm): 139.3 (C), 135.9 (NCHN), 132.9 (C), 131.5 (CH), 129.9 (CH), 127.6 (CH), 126.5 (CH), 124.2 (CH), 122.8 (CH), 50.5 (CH₂), 31.8 (CH₂), 30.0 (CH₂), 29.5 (CH₂), 29.4 (CH₂), 29.3 (CH₂), 29.2 (CH₂), 28.8 (CH₂), 26.0 (CH₂), 23.5 (CH₂), 22.6 (CH₂), 14.4 (CH₃), 14.0 (CH₃)

Elementary analysis (C₂₄H₃₅F₆N₃O₄S₂)
calcd.: C, 47.44%, H, 5.81%, N, 7.02%, S, 10.55%.
found: C, 47.45%, H, 5.62%, N, 7.06%, S, 10.26%.

1-(2-Ethylphenyl)-3-tetradecyl-1H-imidazoliumbis(trifluoromethyl)sulfonylimide (C₂₇H₄₁F₆N₃O₄S₂, 649.753 g/mol)

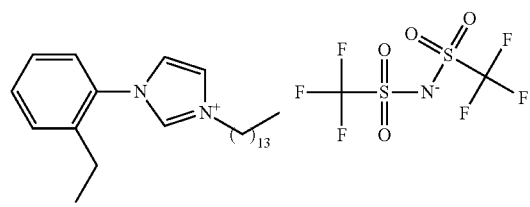

2.25 g (5 mmol) 1-(2-ethylphenyl)-3-tetradecyl-1H-imidazoliumbromide and 1.72 g lithium bis(trifluoromethylsulfonyl)amide are dissolved in 50 mL of water-methanol mixture and 10 mL of dichloromethane are added. After stirring for 20 hours at room temperature, the organic phase is separated and concentrated on the rotary evaporator.

The liquid product is obtained in 100% yield (3.27 g).

¹H-NMR (300 MHz, CDCl₃, ppm): 8.72 (1H, s, NCHN), 7.52 (1H, m, NCHC), 7.46 (1H, m, CH arom.), 7.29 (4H, m, CH arom., NCHC), 4.24 (2H, t, J=7.6 Hz, CH₂), 2.38 (2H, q, J=7.6 Hz, CH₂), 1.86 (2H, m, CH₂), 1.20 (22H, m, 11xCH₂), 1.07 (3H, t, J=7.6 Hz, CH₃), 0.80 (3H, t, J=6.9 Hz, CH₃)

¹³C-NMR (75.5 MHz, CDCl₃, ppm): 139.2 (C), 135.9 (NCHN), 132.9 (C), 131.5 (CH), 130.0 (CH), 127.6 (CH), 126.5 (CH), 124.2 (CH), 122.7 (CH), 50.5 (CH₂), 31.9 (CH₂), 30.0 (CH₂), 29.6 (CH₂), 29.5 (CH₂), 29.4 (CH₂), 29.3 (CH₂), 28.8 (CH₂), 26.0 (CH₂), 23.6 (CH₂), 22.6 (CH₂), 14.4 (CH₃), 13.1 (CH₃)

Elementary analysis (C₂₇H₄₁F₆N₃O₄S₂)
calcd.: C, 49.91%, H, 6.36%, N, 6.47%, S, 9.87%.
found: C, 49.67%, H, 6.18%, N, 6.64%, S, 9.51%.

1-(2-Bromophenyl)-3-methyl-1H-imidazoliumbis(trifluoromethyl)sulfonylamide (C₁₂H₁₀BrF₆N₃O₄S₂, 518.253 g/mol)

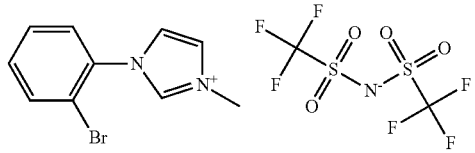

1.534 g (4.23 mmol) 1-(2-bromophenyl)-3-methyl-1H-imidazoliumiodide and 1.45 g lithium bis(trifluoromethylsulfonyl)amide are dissolved in water and dichloromethane is added. The reaction mixture is stirred for 24 hours at room temperature and the organic phase is separated subsequently. After removal of the solvent, the product (melting point 15° C.) is obtained in 99% yield.

Thermic stabilty: Decomposition onset: 337° C., inflection point: 450° C.

¹H-NMR (300 MHz, d⁶-DMSO, ppm): 8.72 (1H, s, NCHN), 7.70 (1H, m, NCHC), 7.49 (2H, m), 7.43 (2H, m), 7.35 (1H, m), 3.98 (3H, s, N—CH₃)

¹³C-NMR (75.5 MHz, d⁶-DMSO, ppm): 136.7 (NCHN), 134.2 (CH), 133.3 (CH), 132.8 (CH), 129.4 (CH), 128.2 (CH), 123.9 (CH), 118.8 (C), 36.8 (CH₃)

Elementary analysis (C₁₂H₁₀BrF₆N₃O₄S₂)
calcd.: C, 27.81%, H, 1.94%, N, 8.11%, S, 12.37%.
found: C, 28.03%, H, 1.70%, N, 8.15%, S, 12.31%.

1-(2-Bromophenyl)-3-undecyl-1H-imidazoliumbis(trifluoromethyl)sulfonylamide (C₂₂H₃₀BrF₆N₃O₄S₂, 658.516 g/mol)

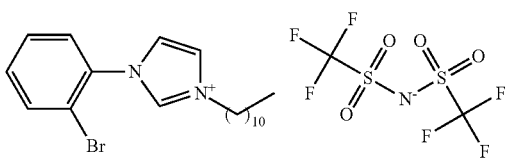

4.91 g (9.7) mmol 1-(2-bromophenyl)-3-undecyl-1H-imidazoliumiodide and 3.07 g lithium bis(trifluoromethylsulfonyl)amide are dissolved in a water-methanol mixture and dichloromethane is added. The reaction mixture is stirred for 24 hours at room temperature and the organic phase is separated subsequently. After removal of the solvent, the product is obtained in 41% yield (2.65 g).

$^1$H-NMR (300 MHz, CDCl$_3$, ppm): 8.79 (1H, s, NCHN), 7.71 (1H, dd, J$_1$=7$_1$, Hz, J$_2$=1.5 Hz, NCHC), 7.52 (2H, m, CH arom.), 7.44 (1H, dd, J$_1$=14.7 Hz, J$_2$=1.51 Hz, NCHC), 7.44 (1H, m, CH arom.), 7.38 (1H, m, CH arom.), 4.26 (2H, t, J=7.6 Hz, N—CH$_2$), 1.88 (2H, m, CH$_2$), 1.22 (16H, m, 8xCH$_3$), 0.80 (3H, t, J=6.8 Hz, CH$_3$)

$^{13}$C-NMR (75.5 MHz, CDCl$_3$, ppm): 144.3 (C—Br), 136.3 (NCHN), 134.2 (CH), 133.4 (C—N), 132.8 (CH), 129.5 (CH), 128.3 (CH), 124.2 (CH), 122.6 (CH), 50.8 (N—CH$_2$), (CH$_2$: 31.9, 29.9, 29.5, 29.4, 29.3, 28.3, 28.8, 26.0, 22.7), 14.1 (CH$_3$)

1-(2-Bromophenyl)-3-tetradecyl-1H-imidazoliumbis(trifluoromethyl)sulfonylamide (C$_{25}$H$_{36}$BrF$_6$N$_3$O$_4$S$_2$, 700.595 g/mol)

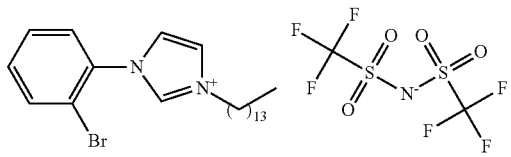

8.3 g (0.015 mol) 1-(4-bromophenyl)-3-tetradecyl-1H-imidazoliumbromide and 4.79 g lithium bis(trifluoromethylsulfonyl)amide are dissolved in water-methanol mixture and dichloromethane is added. The reaction mixture is stirred for 24 hours at room temperature and the organic phase is separated subsequently. After removal of the solvent, the product is obtained in 99% yield (10.37 g).

$^1$H-NMR (300 MHz, CDCl$_3$, ppm): 8.79 (1H, s, NCHN), 7.71 (1H, dd, J$_1$=9.3 Hz, J$_2$=1.5 Hz, NCHC), 7.51 (2H, m, CH arom.), 7.44 (1H, m, CH arom.), 7.44 (1H, dd, J$_1$=17.2 Hz, J$_2$=1.5 Hz, NCHC), 4.26 (2H, t, J=7.4 Hz, N—CH$_2$), 1.87 (2H, m, CH$_2$), 1.24 (22H, m, 11xCH$_2$), 0.80 (3H, t, J=6.9 Hz, CH$_3$), $^{13}$C-NMR (75.5 MHz, CDCl$_3$, ppm): 144.3 (C—Br), 136.2 (NCHN), 134.1 (CH), 133.4 (C—N), 132.8 (CH), 129.4 (CH), 128.3 (CH), 124.1 (CH), 122.6 (CH), 50.7 (N—CH$_2$), (CH$_2$: 31.9, 29.9, 29.6, 29.5, 29.4, 29.3, 28.8, 23.9, 22.6), 14.1 (CH$_3$)

1-(4-Chlorophenyl)-3-butyl-1H-imidazoliumbis(trifluoromethyl)sulfonylamide (C$_{15}$H$_{16}$ClF$_6$N$_3$O$_4$S$_2$, 515.879, g/mol)

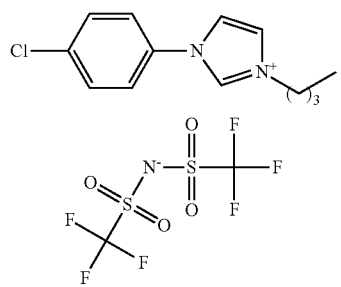

2.96 g (8.2 mmol) 1-(4-chlorophenyl)-3-butyl-1H-imidazoliumiodide and 2.58 g lithium bis(trifluoromethylsulfonyl)amide are dissolved in a water-methanol mixture. The reaction mixture is stirred for 2 days at room temperature and subsequently dichloromethane is added for a better phase separation. The organic phase is separated. After removal of the solvent, an oily liquid is obtained (96% yield).

$^1$H-NMR (300 MHz, CDCl$_3$, ppm): 8.99 (1H, s, NCHN), 7.61 (1H, s, NCHC), 7.47 (5H, m, NCHC, CH arom.), 4.21 (2H, t, J=7.6 Hz, N—CH$_2$), 1.84 (2H, m, CH$_2$), 1.32 (2H, m, CH$_2$), 0.89 (3H, t, J=7.4 Hz, CH$_3$)

$^{13}$C-NMR (75.5 MHz, CDCl$_3$): 136.6 (C—Cl), 133.9 (NCHN), 132.7 (C—N), 123.5 (CH), 121.8 (CH), 50.4 (N—CH$_2$), 31.8 (CH$_2$), 19.3 (CH$_2$), 13.1 (CH$_3$)

Elementary analysis (C$_{15}$H$_{16}$ClF$_6$N$_3$O$_4$S$_2$)
calcd.: C, 34.92%, H, 3.13%, N, 8.15%, S, 12.43%.
found: C, 34.85%, H, 3.20%, N, 8.36%, S, 12.63%.

1-(4-Chlorophenyl)-3-hexyl-1H-imidazoliumbis(trifluoromethyl)sulfonylamide (C$_{17}$H$_{20}$ClF$_6$N$_3$O$_4$S$_2$, 543.932 g/mol)

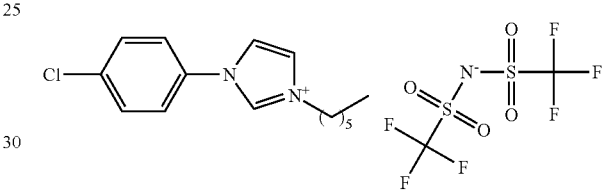

2.80 g (7.2 mmol) 1-(4-chlorophenyl)-3-hexyl-1H-imidazoliumiodide and 2.26 g lithium bis(trifluoromethylsulfonyl)amide are dissolved in a water-methanol mixture. The reaction mixture is stirred for 2 days at room temperature and subsequently dichloromethane is added for a better phase separation. The organic phase is separated. After removal of the solvent, an oily liquid is obtained (95% yield).

$^1$H-NMR (300 MHz, d$^6$-DMSO, ppm): 9.83 (1H, s, NCHN), 8.33 (1H, m, NCHC), 8.05 (1H, m, NCHC), 7.84 (2H, d, J=7 Hz, Ar—H), 7.77 (2H, d, J=7 Hz, Ar—H), 4.25 (2H, t, J=7.1 Hz, N—CH$_2$), 1.89 (2H, m, CH$_2$, 1.33 (3H, m, 3xCH$_2$), 0.89 (3H, t, J=6.6 Hz, CH$_3$)

$^{13}$C-NMR (75.5 MHz, d$^6$-DMSO, ppm): 134.6 (NCHN), 130.1 (2CH), 123.7 (2CH), 123.3 (CH), 121.9 (C), 121.6 (CH), 49.4 (N—CH$_2$), 30.6 (CH$_2$), 29.1 (CH$_2$), 25.2 (CH$_2$), 21.8 (CH$_2$), 13.8 (CH$_3$)

Elementary analysis (C$_{17}$H$_{20}$ClF$_6$N$_3$O$_4$S$_2$)
calcd.: C, 37.54%, H, 3.71%, N, 7.73%, S, 11.79%.
found: C, 37.19%, H, 3.13%, N, 7.69%, S, 12.43%.

1-(4-Chlorophenyl)-3-undecyl-1H-imidazoliumbis(trifluoromethyl)sulfonylamide (C$_{22}$H$_{30}$ClF$_6$N$_3$O$_4$S$_2$, 614.065 g/mol)

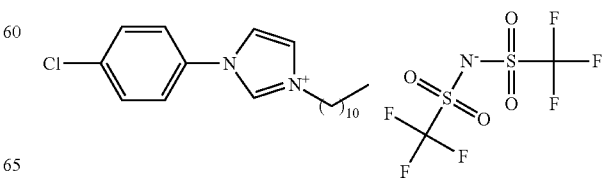

1.04 g (2.3 mmol) 1-(4-chlorophenyl)-3-undecyl-1H-imidazoliumiodide and 0.71 g lithium bis(trifluoromethylsulfonyl)amide are dissolved in a water-methanol mixture. The reaction mixture is stirred for 2 days at room temperature and subsequently dichloromethane is added for a better phase separation. The organic phase is separated. After removal of the solvent, an oily liquid is obtained (98% yield).

$^1$H-NMR (300 MHz, CDCl$_3$, ppm): 9.03 (1H, s, NCHN), 7.61 (1H, m, NCHC), 7.48 (5H, m, NCHC+CH arom.), 4.22 (2H, t, J=7.7 Hz, N—CH$_2$), 1.86 (2H, m, CH$_2$), 1.22 (16H, m, 8xCH$_2$), 0.88 (3H, t, J=6.8 Hz, CH$_3$)

$^{13}$C-NMR (75.5 MHz, CDCl$_3$, ppm): 136.8 (C—Cl), 134.0 (NCHN), 132.7 (C—N), 130.8 (CH), 123.5 (CH), 123.4 (CH), 121.9 (CH), 50.8 (N—CH$_2$), (CH$_2$: 31.8, 30.0, 29.5, 29.4, 29.3, 29.2, 28.8, 26.1, 22.6), 14.0 (CH$_3$)

Elementary analysis (C$_{22}$H$_{30}$ClF$_6$N$_3$O$_4$S$_2$)
calcd.: C, 43.03%, H, 4.92%, N, 6.84%, S, 10.44%.
found: C, 43.26%, H, 5.11%, N, 7.07%, S, 10.01%.

1-(2-Methoxy-4-nitrophenyl)-3-undecyl-1H-imidazoliumbis(trifluoromethyl)sulfonylimide (C$_{23}$H$_{33}$F$_6$N$_3$O$_3$S$_2$, 654.643 g/mol)

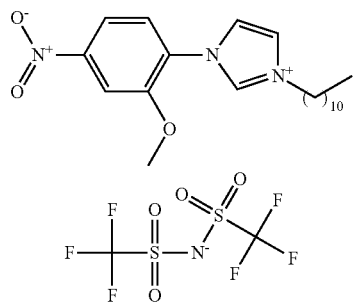

2.61 g (5.21 mmol) 1-(2-methoxy-4-nitrophenyl)-3-undecyl-1H-imidazoliumiodide and 1.79 g (6.25 mmol) lithium bis(trifluoromethylsulfonyl)amide are dissolved in 60 mL of a methanol-water mixture and 10 mL of Byker methane are added. After stirring for 20 hours at room temperature the organic phase is separated and concentrated on the rotary evaporator. The liquid product is obtained in 93% yield (3.15 g).

$^1$H-NMR (300 MHz, CDCl$_3$, ppm): 9.09 (1H, s, NCHN), 7.88 (2H, s, NCHC), 7.67 (1H, d, J=8.12 Hz, CH arom.), 7.61 (1H, m, CH arom.), 7.48 (1H, m, CH arom.), 4.25 (2H, t, J=7.6 Hz, N—CH$_2$), 3.96 (3H, s, O—CH$_3$), 1.87 (2H, m, CH$_2$), 1.20 (16H, m, 8xCH$_2$), 0.79 (3H, t, J=7.0 Hz, CH$_3$)

$^{13}$C-NMR (75.5 MHz, CDCl$_3$, ppm): 152.7 (C), 149.4 (C), 136.3 (CH), 127.8 (C), 126.6 (CH), 123.5 (CH), 122.4 (CH), 108.0 (CH), 57.1 (O—CH$_3$), 50.7 (N—CH$_2$), 31.8 (CH$_2$), 29.9 (CH$_2$), 29.4 (CH$_2$), 29.3 (CH$_2$), 29.2 (CH$_2$), 28.8 (CH$_2$), 26.0 (CH$_2$), 22.6 (CH$_2$), 14.0 (CH$_3$)

Elementary analysis (C$_{23}$H$_{33}$F$_6$N$_3$O$_5$S$_2$.0.485H$_2$O)
calcd.: C, 41.64%, H, 5.01%, N, 8.45%, S, 9.65%.
found: C, 41.16%, H, 4.14%, N, 9.15%, S, 9.42%.

The invention claimed is:

1. A process for extraction of at least one metal from an aqueous phase, the process comprising extracting the at least one metal with an ionic liquid of general formula (I)

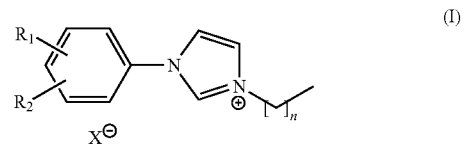

wherein
i) X$^-$ is an anion,
ii) n is a number from 0 to 14,
iii) R$^1$ and R$^2$ independently from each other are —H, -halogen, —NO$_2$, —NH$_2$, —NHR$_x$, —N(R$_x$)$_2$, —R$_x$, —C(O)OH, —C(O)OR$_x$, —C(O)R$_x$ or —OR$_x$, wherein R$_x$ is a straight-chained or branched, substituted or unsubstituted C1 to C18 alkyl group;
wherein no additional extracting agent is used;
wherein the pH value of the aqueous phase is between 8 and 0; and
wherein the at least one metal to be extracted is selected from the group consisting of heavy metals, the group of rare earths and the group of actinides.

2. The process according to claim 1, wherein X$^-$ is bis(trifluoromethylsulfonyl)imide or dicyanamide.

3. The process according to claim 1, wherein n=5 to 13.

4. The process according to claim 1, wherein R$^1$ is —H and R$^2$ is selected from the group consisting of —H, -halogen, —NO$_2$, —NH$_2$, —NHR$_x$, —N(R$_x$)$_2$, —R$_x$, —C(O)OH, —C(O)OR$_x$, —C(O)R$_x$ and —OR$_x$, wherein R$_x$ is a straight-chained or branched, substituted or unsubstituted C1 to C18 alkyl group.

5. The process according to claim 1, wherein R$^1$ and/or R$^2$ are groups with a +M-effect.

6. The process according to claim 5, wherein R$^2$ is -halogen or —OR$_x$, wherein R$_x$ is a straight-chained or branched, substituted or unsubstituted C1 to C18 alkyl group.

7. The process according to claim 1, wherein the metal to be extracted is platinum and/or europium.

8. The process according to claim 1, wherein the process is carried out in a pH range between 5 and 0.

9. The process according to claim 1, wherein the extraction ratio does not decrease by more than 60% over the whole pH range.

10. The process according to claim 1, wherein the extraction is a selective extraction of at least one metal from a mixture of at least two metals in an aqueous phase.

* * * * *